(12) United States Patent
Mutikainen et al.

(10) Patent No.: US 7,885,208 B2
(45) Date of Patent: Feb. 8, 2011

(54) IP-BASED SERVICES FOR CIRCUIT-SWITCHED NETWORKS

(75) Inventors: Jari Mutikainen, Helsinki (FI); Juha Kallio, Helsinki (FI); Lauri Lahtinen, Espoo (FI); Heikki Einola, Espoo (FI); Jarmo Kuusinen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 1369 days.

(21) Appl. No.: 10/799,671

(22) Filed: Mar. 15, 2004

(65) Prior Publication Data

US 2005/0058125 A1 Mar. 17, 2005

(30) Foreign Application Priority Data

Sep. 11, 2003 (EP) .................................. 03020723
Dec. 8, 2003 (EP) .................................. 03028179

(51) Int. Cl.
H04L 12/18 (2006.01)
(52) U.S. Cl. ....................................... 370/260; 370/352
(58) Field of Classification Search ......... 370/260–269, 370/352–356
See application file for complete search history.

(56) References Cited

U.S. PATENT DOCUMENTS

| | | | | |
|---|---|---|---|---|
| 6,480,474 | B2 * | 11/2002 | Johnson et al. ............. | 370/260 |
| 6,535,730 | B1 * | 3/2003 | Chow et al. ................. | 455/416 |
| 6,614,781 | B1 * | 9/2003 | Elliott et al. ................ | 370/352 |
| 6,731,609 | B1 * | 5/2004 | Hirni et al. .................. | 370/260 |
| 6,775,269 | B1 * | 8/2004 | Kaczmarczyk et al. ...... | 370/352 |
| 6,804,224 | B1 * | 10/2004 | Schuster et al. ............. | 370/352 |
| 6,871,070 | B2 * | 3/2005 | Ejzak ....................... | 455/435.1 |

(Continued)

FOREIGN PATENT DOCUMENTS

EP 1 164 774 A 12/2001

(Continued)

OTHER PUBLICATIONS

Communication from EPO dated Mar. 3, 2009 (Notice of Allowance).

(Continued)

*Primary Examiner*—Ricky Ngo
*Assistant Examiner*—Ben H Liu
(74) *Attorney, Agent, or Firm*—Mintz Levin Cohn Ferris Glovsky and Popeo, P.C.

(57) ABSTRACT

A mechanism for providing a connection from an IP-based network to a circuit-switched network, such as a GSM network is disclosed. A temporary routing number for the circuit-switched network, such as an E.164 number, is delivered to a user terminal, and a circuit-switched call leg is established from the user terminal to the IP-based network using the routing number. Thereby, IMS-services are provided for end users which are located in the radio access network not having sufficient QoS required for voice over IP. In the example of a conference call service, a request for a conference call may forwarded via a data channel or data path to an application server which provides that conference call service. The application server then selects a conference routing number and returns the routing number to the conference host terminal via the data channel. Using the received conference routing number, the conference host terminal can then set up a circuit-switched connection as a call leg of the conference call.

56 Claims, 11 Drawing Sheets

U.S. PATENT DOCUMENTS

| | | | | |
|---|---|---|---|---|
| 6,904,035 | B2* | 6/2005 | Requena | 370/338 |
| 7,042,871 | B2* | 5/2006 | Gallant et al. | 370/352 |
| 7,065,199 | B1* | 6/2006 | Hyllander et al. | 379/211.02 |
| 7,085,260 | B2* | 8/2006 | Karaul et al. | 370/352 |
| 7,155,528 | B2* | 12/2006 | Tam | 709/230 |
| 7,184,415 | B2* | 2/2007 | Chaney et al. | 370/260 |
| 7,233,589 | B2* | 6/2007 | Tanigawa et al. | 370/352 |
| 7,254,643 | B1* | 8/2007 | Peters et al. | 709/246 |
| 2002/0024943 | A1* | 2/2002 | Karaul et al. | 370/338 |
| 2003/0108000 | A1* | 6/2003 | Chaney et al. | 370/260 |
| 2004/0125932 | A1* | 7/2004 | Orbach et al. | 379/202.01 |
| 2004/0125933 | A1* | 7/2004 | Jun et al. | 379/202.01 |
| 2004/0190498 | A1* | 9/2004 | Kallio et al. | 370/352 |
| 2005/0058125 | A1* | 3/2005 | Mutikainen et al. | 370/354 |
| 2005/0165894 | A1* | 7/2005 | Rosenberg et al. | 709/205 |
| 2007/0165607 | A1* | 7/2007 | Mussman et al. | 370/352 |

FOREIGN PATENT DOCUMENTS

| | | |
|---|---|---|
| WO | WO 99/12365 A | 3/1999 |
| WO | WO 02/052825 A | 7/2002 |
| WO | WO 03/054717 A | 7/2003 |

OTHER PUBLICATIONS

International Preliminary Report on Patent Ability issued by the European Patent Office for International Application PCT/IB2004/002846.

International Search Report issued by the European Patent Office for International Application PCT/IB2004/002846.

* cited by examiner

IP-BASED SERVICES FOR CIRCUIT-SWITCHED NETWORKS

FIELD OF THE INVENTION

The present invention relates to a method, server device, terminal device and computer program product for establishing a connection from an IP-based network to a user terminal via a circuit-switched network. In particular, the established connection for providing a service from an IMS (IP Multimedia Subsystem) network to a circuit-switched (CS) network, such as a GSM network.

BACKGROUND OF THE INVENTION

In order to achieve access independence and to maintain a smooth interoperation with wired terminals across the Internet, an IP multimedia subsystem (IMS) core network as specified e.g. in the 3GPP (Third Generation Partnership Project) specification TS 23.228 has been developed to be conformant to IETF (Internet Engineering Task Force) "Internet Standards". The IMS enables network operators of mobile or cellular networks to offer their subscribers multimedia services based on and built upon Internet applications, services and protocols. The intention is to develop such services by mobile network operators and other third party suppliers including those in the Internet space using the mechanisms provided by the Internet and the IMS. The IMS thus enables conversion of, and access to, voice, video, messaging, data and web-based technologies for wireless users, and combines the growth of the Internet with the growth in mobile communications. In IMS, the Session Initiation Protocol (SIP) is used as the main session control protocol between end user equipments and Call State Control Functions (CSCFs) located in the IMS. SIP enables network operators to provide new features for end users such as dialing with the use of SIP Uniform Resource Indicators (SIP URIs).

The 3GPP Release 6 standard will introduce interworking between the IMS and the CS domain. 3GPP will however only specify procedures to have speech calls placed between the CS domain and IMS. Interworking is provided with introduction of Media Gateway Control Function (MGCF) and IMS-Media Gateway (IMS-MGW). Interworking of other type of calls such as video telephony are currently out of scope.

In order to provide similar speech service with service capabilities offered by IMS over the IP, sufficient end-to-end Quality of Service (QoS) is required. In most cases the sufficient QoS can be achieved from the core network but QoS in radio access networks can be difficult to achieve. This is especially the case in networks which does not have UMTS radio access or GERAN/GPRS radio access with support of conversational traffic class.

Such situation is present e.g. in United States of America or in general, countries that are either not capable of or have not planned to provide 3G in the near future. Also use of enhanced GPRS (E-GPRS) has been analysed to be problematical in order to support voice over IP connections.

Sufficient QoS for voice over IP cannot be achieved from 2G or 2.5G radio networks if conversational traffic class is not supported by user equipment (UE), radio access network and core network. This will prevent use of IMS based services for voice calls, if nothing is done, in the Public Land Mobile Networks (PLMNs). Also the roaming of IMS subscriber is limited by this lack of functionality, because when end user is roaming in such PLMNs that do not support sufficient QoS, CS services need to be used instead.

IETF and 3GPP are working on a SIP conferencing service. The goal is to define how conferencing type of service can be established between 3GPP compliant SIP terminals. Simultaneously with this work, it is also studied how the interworking between 3GPP IMS and legacy circuit-switched (CS) core network domains can be achieved. A cellular network, i.e. a Public Land Mobile Network (PLMN) can be regarded as an extension of networks with CS domains and packet switched (PS) domains within a common numbering plan and a common routing plan. The PLMN infrastructure is logically divided into a core network (CN) and an access network (AN) infrastructure, while the CN infrastructure is logically divided into a CS domain, a PS domain and an IMS. The CS and PS domains differ by the way they support user traffic. These two domains are overlapping, i.e. they contain some common entities. A PLMN can implement only one domain or both domains. In particular, the CS domain refers to the set of all CN entities offering CS type of connections for user traffic as well as all the entities supporting the related signaling. A CS type of connection is a connection for which dedicated network resources are allocated at the connection establishment and released at the connection release. The PS domain refers to the set of all CN entities offering PS type of connections for user traffic as well as all the entities supporting the related signaling. A PS type of connection transports the user information using autonomous concatenation of bits called packets, wherein each packet can be routed independently from the previous one. The IMS domain comprises all CN elements for provision of IP multimedia services comprising audio, video, text, chat, etc. and a combination of them delivered over the PS domain.

So far, conferencing has been considered from IMS point of view where simultaneously communicating parties are IMS subscribers with IMS subscription. This scope enables the full end to end use of SIP between the participants. SIP is an application-layer control protocol for creating, modifying and terminating sessions with one or more participants. These sessions include Internet multimedia conferences, Internet telephone calls and multimedia distribution. In SIP-based conferencing, a conference-URI (Uniform Resource Indicator), e.g.:

SIP: conf_234@conference.operator.com is used to establish a conference. A drawback of this solution is that it is completely based on IP and thus cannot be used with GSM technology.

The 3GPP Release 5 standard specifies a limited set of services, like call forwarding, call line identification, etc. 3GPP Release 6 will introduce more services, conference call being one of them. Conference call is currently under standardization in IETF, and the 3GPP will adopt the service from there to its own standards.

The Release 6 conference call service will bring several benefits compared to the existing service e.g. in GSM network. In order to provide similar features in CS mobile networks, enhancements to the existing GSM service are needed. In particular, the conventional GSM conference call service lacks many of the features that have been planned in the All-IP conference framework. These features can be seen as requirements that the enhanced service must fulfill and cover easy and fast creation of the conference call from mobile terminal, while each participant has to know whether she/he has been added to the conference, who else is in the same conference, if others join the conference, if others leave the conference during the session, for how long the conference session has been running, or when others have been joined.

In GSM, the user needs to call the members and add them to the conference one-by-one. This obviously takes time if the group is large. Furthermore, the creator of the conference needs to set up a private call to the new participant, while the conference session is on hold. In this private call the creator usually tells the participant that he/she is being added to a conference. GSM does not provide an automatic mechanism to share this information. Usually the creator introduces all participants to each other, and tells to others that he/she is adding a new participant to the conference. The participant who is leaving tells it before doing so. A resulting problem is that the call might be dropped accidentally or by network or radio link failure. In these cases it might take a long time before the other participants realize this. The only way for a participant to know how long the session has been running or when other have been joined is to ask it from the creator or certain participants. Furthermore, the only way to moderate the conference is to tell orders in the voice channel. The only way to know who has a right to speak is to listen to the orders the moderator is telling. GSM does not provide an automatic mechanism to share the above mentioned different kinds of information. Furthermore, voice channels are used inefficiently since there is no central point in the network to mix the voice channels.

Moreover, if the conference creator drops out, the whole conference will be lost. In addition, the maximum number of participants in the GSM conference call, i.e. multiparty call, is six.

SUMMARY OF THE INVENTION

It is an object of the present invention to provide the possibility for network operators to provide IP-services for end users which are located in a radio access network not having sufficient QoS for a desired type of service.

This object is achieved by a method for establishing a connection from an IP-based network to a user terminal via a circuit-switched network, said method comprising the steps of:
  delivering a temporary routing number to said user terminal; and
  establishing a circuit-switched call leg from said user terminal to said IP-based network using said routing number.

Furthermore, the above object is achieved by a terminal device for providing a connection to an IP-based network via a circuit-switched network, said terminal device comprising:
  communicating means for receiving a temporary routing number delivered to said user terminal; and
  establishing means for establishing a circuit-switched call leg from said user terminal to said IP-based network using said routing number.

Additionally, the above object is achieved by a server device for providing a connection from an IP-based network to a circuit-switched network, said server device comprising communicating means for receiving from said circuit-switched network a connection request via a data path and for delivering via said data path a temporary routing number for said circuit-switched network.

Finally, the above object is achieved by a computer program product comprising code means adapted to produce the steps of the above method when loaded into the memory of a terminal device.

Accordingly, a possibility is given e.g. to IMS network operators to provide IMS-services for end users which are located in the radio access network not having sufficient QoS required for voice over IP. For example if end user is currently located in "2.5G" radio access network with GPRS connectivity. This solution does not require any modifications to the CS domain and thus same equipments can be applied.

The SIP UE should be able to have both IP connectivity (PS domain) and voice connectivity (CS domain) simultaneously, e.g., the UE can be compliant with either GPRS class A or Dual Transfer Mode (DTM). Other possibility is to use WLAN simultaneously with CS domain, if the UE has both WLAN and GSM radio. Additionally, the SIP UE should be able to act upon the (SIP) information in order to establish circuit switched connection via CS domain whenever so required. In summary the proposed solution will enable SIP UE to use CS domain as transport layer for speech calls, still providing services from IMS.

End user's SIP-enabled UE is thus able to use IMS services for voice calls from virtually any radio access network that UE supports. Requirement is of course that IP connectivity can be obtained somehow from the UE before the actual call. This provides the advantage that no major changes are required for the IMS domain and especially no changes at all to CS domain. Changes are encapsulated into the UE and IMS-domain controllers (x-CSCFs) and thus manageable.

The delivering step may be performed by using at least one SIP session setup message. The SIP session may then remain active during the circuit-switched call. The use of SIP (SDP) enables transportation of routing number (e.g. E.164 number) in order to establish a CS based bearer channel simultaneously during active SIP session. As an example, the establishing step can be performed using Integrated Services Digital Network User Part protocol.

Furthermore, before said delivering step, it may be performed an additional step of detecting whether said circuit-switched call leg is supported by said user terminal and said IP-based network. As an example, this additional detecting step may be performed within a registration procedure.

The circuit-switched call leg is a call leg from an originating call. As an alternative, the circuit-switched call leg may be a call leg from a terminating call.

The E.164 number may be delivered to said user terminal from a call control element of said IP-based network. The user terminal may be located outside its home network.

Additionally, there may be provided a step of converting said circuit-switched call leg into a Voice-over-IP connection in a core network of said IP-based network.

In case of a conference call service as a specific example, a conference request directed to an application server which provides the conference call service may be transmitted via a data path, the temporary routing number may then be received as a conference routing number for the requested conference call in response to the request; and the received conference routing number may be used to set up said circuit-switched call leg as a call leg of said conference call.

Thereby, a conferencing mechanism is provided by which existing 2nd generation conference services are enhanced to provide similar functionalities as currently being standardized in IETF/3GPP Release 6 for IP-based networks, e.g., All-IP IMS networks. Thus, users without VoiP (Voice over IP) capability may use IMS voice conferencing services, so that IMS-based voice conferencing is allowed before the availability of VoIP.

According to the proposed solution, it is possible to implement many features already now in CS mobile networks, without any need to wait for the deployment of All-IP networks. A conference routing number which can be used in the circuit-switched network to route separate call legs to the conference server is allocated and forwarded to the participants in the circuit-switched network. The user plane can then be mixed at a media gateway device. Modifications are therefore only required at conference-aware terminal devices and at the conference server. These changes can easily be implemented by corresponding changes of the control applications running on these devices. No changes are required in the network, as routing can be done like in normal circuit-switched cases.

Participants of the conference call can be selected and a corresponding information specifying the selected participants can be added to the conference request. Thereby, the participants are specified at the conference server and requesting callers can be checked if they are authorized to participate at the conference call.

The transmitting step may be performed based on a pre-configured address information. This pre-configured address information may be set in a service subscription stage of a respective terminal device. This assures a quick and automatic setup of a conference call by a circuit-switched terminal. As an alternative, the address information may be obtained using a client configuration mechanism, which may be based for instance on SIP, DHCP, or means specifically designed for this use.

The conference routing number may be an E.164 number. Thus, a normal telephone number is used instead of the conference-URI for routing the call towards the conference server.

Furthermore, a session-related information can be added to the request, wherein the session-related information may comprise at least one of a subject, a picture of the subject, and an importance of the conference session, to thereby inform the conference server about specific particularities of the requested conference call. In addition, information on payer of the conference or payer of the individual call legs can be added. Other conference session related information might be animation, video clip, sound clip, textual description, and the like.

The data path can be any data transmission path, channel, bearer or session, which provides capability of transmission of the conference request to the application server. As an example, the conference request may be transmitted by using Short Message Service (SMS). As an alternative example, the conference request may be transmitted by using Unstructured Supplementary Service Data (USSD), Wireless Application Protocol (WAP), or Hyper Text Transfer Protocol (HTTP). As a further alternative example, the conference request may be transmitted by using a SIP (Session Initiation Protocol) message. In this case, at least one Session Initiation Protocol and/or Service Description Protocol extension may be used for communicating CS specific information.

Hence, an easy and fast way to request a conference call and receive a conference routing number from the conference server is provided. The circuit-switched connection may be set up to a media gateway control device which may then route the circuit-switched call to the conference server. In particular, the media gateway control device may convert the conference routing number into an IP-based conference address. The routing number can be reserved at the conference server during the conference call.

A request to join the conference call may be forwarded from the conference server to other participants specified in a conference request. In particular, the join request may comprise at least one of an identification of the conference initiator, a subject of the conference session, and an information about a moderation of the conference session. By this request, participants are aware that the call is not a regular telephony call, but a conference session, and thus this request fulfills the initially mentioned specific information requirement that enhanced services should fulfill. Moreover, the information about other participants in the conference session fulfills the initially mentioned requirement that each participant should know who else is participating in the same conference.

If a participant shall be excluded from the conference call, a respective kick-out request may be forwarded by the conference server via the data path. This kick-out request may include an identification of the conference call and the participant to be excluded. Hence, also an easy and quick option to kick out participants without requiring excessive signaling or processing capacity is provided.

The conference call may support at least one of an audio component, a non-real time video component, an application component and a chatting component.

The connection set-up may be performed via the Mt interface using the Conference Policy Control Protocol (CPCP). This provides the advantage that circuit-switched subscribers do not necessarily require IMS subscription, since the call does not have to be routed through the IMS to the conference server. Instead, a direct interface between the conference server and the media gateway control device is provided. As an alternative, the connection set-up may be performed using SIP if the circuit-switched subscriber has an IMS subscription.

The communication means of the terminal device may be configured to use the respective data channel for forwarding the request. The communication means and the establishing means may be integrated in a conference call application or even a generic or normal native telephony application of the terminal device. This conference call application may be implemented as a native client application or as a MIDlet application. Thereby, easy enhancement of $2^{nd}$ generation terminal devices is possible to support the IP-based conference call service.

The server device or conference server may comprise allocating means for allocating the conference routing number as a temporary E.164 number to the conference call. In particular, a block of E.164 numbers for conference calls may be reserved by the allocating means. This reserved block of E.164 number may comprise a sub-block of toll-free numbers and sub-block of charged numbers. In this case, the allocating means may be configured to select the E.164 number from the sub-blocks based on a charging information included in the conference request.

Furthermore, the communicating means may be configured to send a conference routing number to other participants specified in the conference request. Checking means may be provided for checking whether callers of received calls relating to the conference call match with the other participants specified in the conference request. Thereby, third persons who know or guess the E.164 conference number cannot join the conference.

Additionally, connection control means may be provided in the server device for connecting together individual call legs of participants in a media gateway device. In this respect, interface means may be provided to establish a direct connection to a media gateway control device so as to enable routing of a set-up call for the conference call from the circuit-switched network to the conference server.

Further advantageous modifications are defined in the dependent claims.

BRIEF DESCRIPTIONS OF THE DRAWINGS

In the following, the present invention will be described in greater detail on the basis of preferred embodiments with reference to the accompanying drawings, in which.

DESCRIPTION OF THE PREFERRED EMBODIMENTS

The preferred embodiments will now be described on the basis of a SIP conferencing functionality in an IMS network environment to which terminal devices of a CS network are connected.

Figure 1:
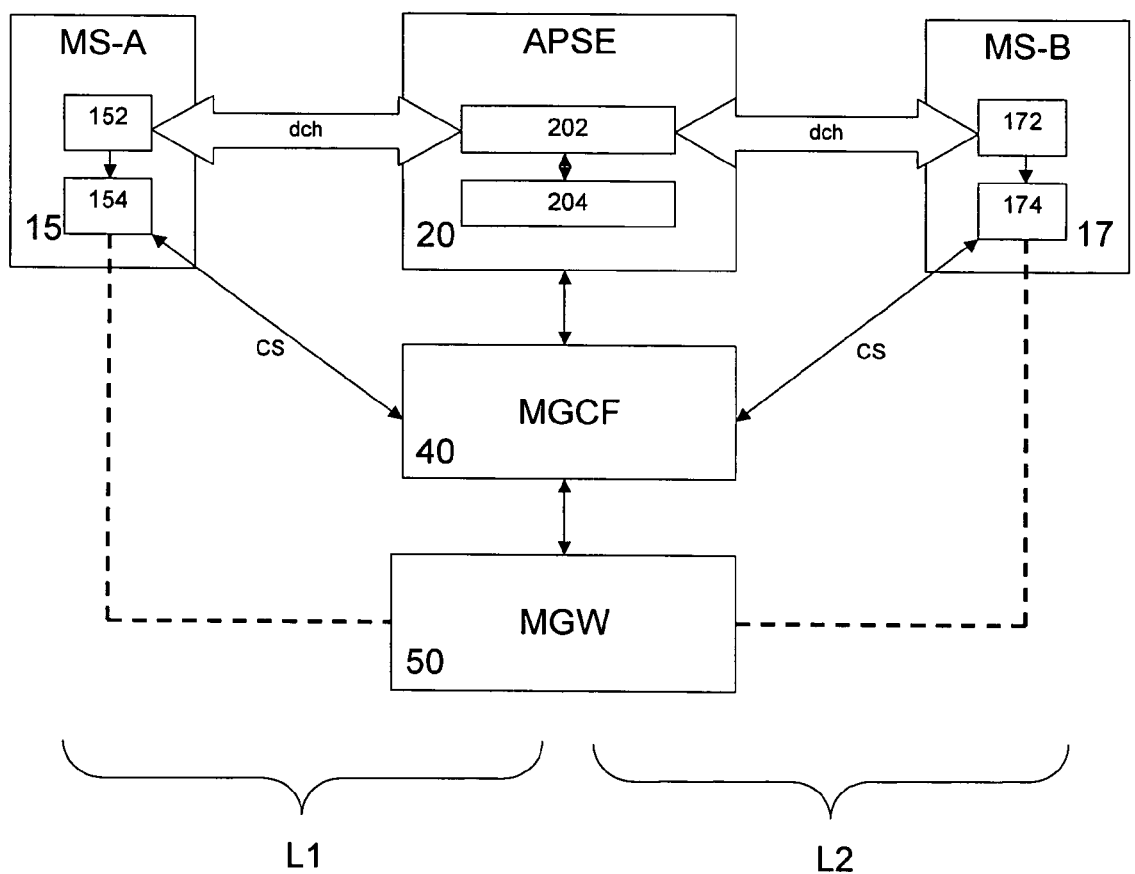
FIG. 1 shows a schematic block diagram of a network configuration according to the preferred embodiments.

FIG. 1 shows a schematic block diagram of the network architecture according to the preferred embodiment, wherein mobile terminals MS-A 15 and MS-B 17 of a GSM (Global System for Mobil communication) network can be directly connected to an application server (APSE) 20 which provides a SIP conferencing functionality or conference service. The individual call legs L1, L2 to the mobile terminals 15, 17 are combined or mixed in a media gateway function (MGW) 50. Further more, a Media Gateway Control Function (MGCF) 40 is provided for controlling the MGW 50. In particular, the MGCF 40 is arranged to control those parts of a call state which pertain to connection control for media channels in the MGW 50. To achieve this, it communicates with Call Session Control Functions (CSCFs) of the IMS network, as defined in the 3GPP specification TS 23.228. The gateway functionality is achieved at the MGCF 40 by performing protocol conversion between the Integrated Services Digital Network User Part (ISUP) protocol and the IMS call control protocols.

The MGW 50 is arranged to terminate bearer channels from the CS network, e.g. the GSM network, and media streams from the packet-switched (PS) network, e.g. the IMS network. The MGW 40 may support media conversion, bearer control and payload processing. It interacts with the MGCF 40 for resource control, owns and handles resources such as echo cancellers etc., and may comprise corresponding codec functions.

According to the preferred embodiment, existing $2^{nd}$ generation conference services are enhanced to provide similar functionalities as in SIP conferencing for IMS networks. In particular, a conference E.164 number or any other conference routing number which can be used in the CS network environment are allocated to route the separate call legs L1 and L2 of the CS network environment to the conference server 20. The MGW 50 is then used to mix the bearers of the user plane. To achieve this, a special conference call application is provided in the conference-aware mobile terminals 15, 17. This conference call application comprises a communication part 152 which uses a data channel dch to communicate with a corresponding communication part 202 of the conference server 20. The communication part 152, 172 communicates with a telephone application 154, 174 to initiate CS calls towards the conference server 20 via the MGCF 40. In the first preferred embodiment, the Conference Policy Control Protocol (CPCP) as described in the IETF Internet Draft "draft-rosenberg-sipping-conference-framework-01. txt" can be used for communication via the Mt or Ut interface between the respective communication parts 152, 172 of the CS terminal devices 15, 17 and the communication part of the conference server 20.

Therefore, in the preferred embodiment, no changes are required in the network, but only in the terminal devices 15, 17 and the conference server 20, since the routing is preformed in the normal CS manner. This solution enables provision of IMS conference services to conventional CS users.

In the following brief description of an establishment of a conference call, it is assumed that the terminal device MS-A 15 is the conference host which creates the conference. In this case, the communication part 152 of the mobile terminal MS-A 15 creates a conference request based on a user selection of a participants e.g. from a phonebook application, and forwards the request via the data channel dch to the conference server 20. The communication part 202 of the conference server 20 receives the conference request and controls an allocation part 204 to allocate a temporary conference E.164 number to the conference, e.g. +49 89 600 1234. This E.164 number is returned by the communication part 202 to the host terminal MS-A 15 of the conference. Moreover, the allocated E.164 number is also sent to the other requested participants as indicated in the conference request.

In response to the receipt of the allocated conference E.164 number, the host terminal MS-A 15 and the other participants, e.g. the terminal MS-B 17, initiate a normal CS call to this E.164 number. These calls are then routed by the normal network routing function to the conference server 20 via the MGCF 40. It is to be noted here that the routing path may involve other CSCF nodes (e.g. I-CSCF or P-CSCF) of the IMS network which have been omitted here for reasons of simplicity.

The conference server 20 receives all the calls and checks whether the callers are the same requested participants as indicated in the original conference request. This may be achieved by checking calling party numbers and compare these numbers to the numbers indicated in the conference request. Then, the conference server 20 controls the MGCF 40 to connect the call legs of the participants together in the MGW 50 to establish the conference call. After the conference, the E.164 number is released by the allocation part 204 of the conference server 20 and can be used again for another conferences.

In particular, the allocation part 204 may reserve a block of E.164 numbers for conference calls. For example, this block may comprise 2000 numbers, e.g. +49 89 600 1000 to +49 89 600 2999. These reserved numbers should be routable in normal telephone networks such as PSTN, GSM or other CS networks. The charging of the conference call may be based on two charging possibilities, e.g., the conference host pays everything or everybody pays for its own call leg. To achieve this, the block of E.164 numbers can be divided into two sub-blocks, e.g., numbers +49 89 600 1000 to +49 89 600 1999 as toll-free numbers in the network where the conference host pays the conference, and numbers +49 89 600 2000 to +49 89 600 2999 as normally charged numbers where each participant pays a normal tariff. Then, the conference host can indicate in the conference request who is going to pay for the conference.

The data channel dch may be a SMS channel to be used as an interface between the conference server 20 and all participants including the host terminal. Then at least the conference host needs the additional communication part 152, 172 which may be implemented by an additional software feature or application of the terminal to create the conference request to be sent to the conference server 20 using SMS or another suitable data channel. The conference server 20 sends the allocated conference E.164 number in respective SMS messages to all participants. Thereby, no specific modifications are required in the terminals of the participants. A normal SMS message may be used, such as:

"You have been invited to conference. Host: +49 175 123 4567. Call to number +49 89 600 1100 to join the conference. The conference is free of charge."

As an advanced alternative, all participating terminals may have respective conference applications which make their user interface more comfortable.

Figure 2:
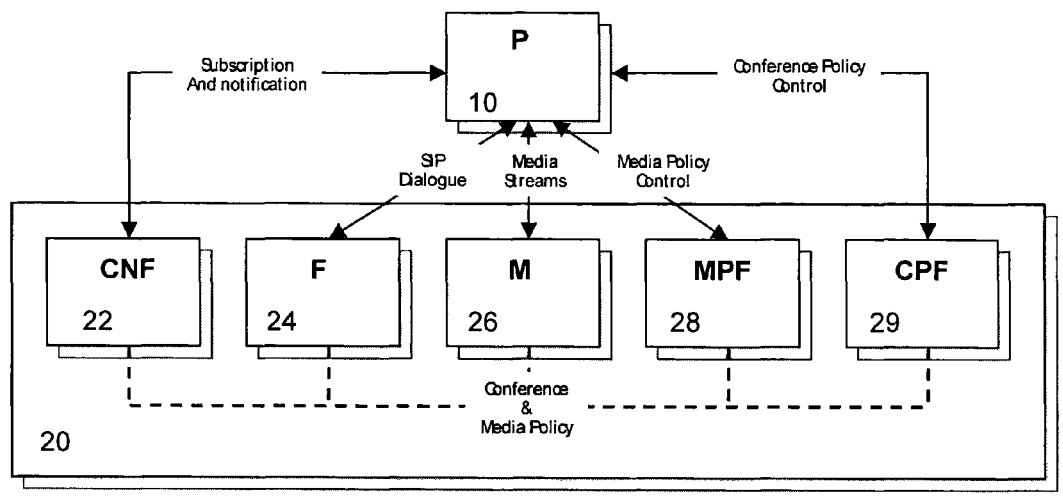
FIG. 2 shows a conventional IETF conference architecture.

FIG. 2 shows an IETF conference framework as used in the conference server 20 and specified in the above mentioned IETF Internet Draft. According to this conference architecture, SIP supports initiation, modification, and termination of media sessions between user agents. A user agent is defined as an interface between the user and a network application. It thus provides an interface to the user and sends and/or receives messages to the network. The central component in a SIP conference is the focus 24 which is a SIP user agent addressed by a conference-URI and identifying a conference. The focus 24 maintains a SIP signaling relationship with each participant in the conference. The result is a star configuration. The focus 24 is responsible for making sure that the media streams which constitute the conference are available to the participants in the conference. It does this through the use of one or more mixers 26, each of which combines a number of input media streams to produce one or more output media streams. The focus 24 uses a media policy to determine the proper configuration of the mixers 26.

Furthermore, the focus 24 has access to a conference policy composed of membership and media policies for each conference. Effectively the conference policy can be thought of as a database which describes the way that the conference should operate. It is the responsibility of the focus 24 to enforce those policies. The conference is represented by a conference-URI which identifies the focus 24. Each conference has a unique focus and a unique conference-URI identifying the focus. Requests to the conference-URI are routed to the focus 24 for that specific conference. In the IMS environment, a user or participant 10 usually joins the conference by sending a SIP INVITE request addressed to the conference-URI. As long as the conference policy allows, the INVITE request is accepted by the focus 24 and the participating terminal 10 is brought into the conference. Users can leave the conference by sending a BYE request, as they would do in a normal call. Similarly, the focus 24 can terminate a dialogue with a participant, should the conference policy change to indicate that the participant is no longer allowed in the conference.

The participant 10 can communicate with a conference policy function 29 of the conference server 20 by using the CPCP protocol. Through this protocol it can affect the conference policy. CPCP and the Media Policy Control Protocol (MPCP) are new protocols at the Mt reference point between the participant 10 and the conference server 20. The CPCP allows the participant 10 to manage the non-media part of the conference, e.g. membership and authorization, and the MPCP allows the participants 10 to manipulate the media in the conference by a corresponding media policy function 28.

Furthermore, a conference notification function 22 is provided in the conference server 20, which acts as a notifier accepting subscription to the conference state, and notifying subscribers about changes to that state. The conference state includes the state maintained by the focus 24 itself, the conference policy, and the media policy. In the IMS network, the participant 10 may be any software element that connects a user to a conference. It implements, at minimum, a SIP user agent.

Thus, as indicated in FIG. 2, the participant 10 interacts with the different functions of the conference server 20 to determine or get informed about the conference and media policy. It is noted that the protocol selections are still open in the IETF standard. For CPCP there are three candidates at the moment, i.e. SOAP, XML-RPC and ACAP. As to the MPCP, at least SOAP and XML-RPC have been proposed.

Figure 3:
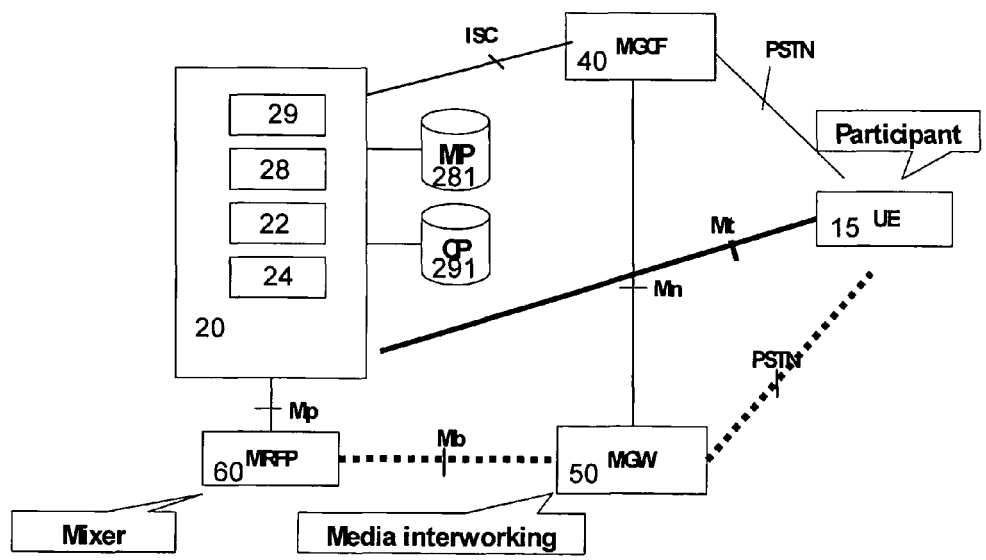
FIG. 3 shows a more detailed block diagram of the network architecture for support of circuit-switched subscribers in an IP-based conference architecture, according to the first preferred embodiment.

FIG. 3 shows a 3GPP architecture for providing support of CS subscribers in SIP conferencing. The IETF framework can be mapped into the 3GPP Release 6 IMS architecture. In particular, the Mt reference point is needed to control conference and media. According to preferred embodiment, a subset of the MPCP and the CPCP are used. As a bearer for communication between the participant 10, which may be an application in a terminal device or user equipment (UE), and the conference server 20 via the Mt reference point, a data bearer such as SMS can be used in the first preferred embodiment. Thereby, direct communication between a participant, e.g. the mobile terminal MS-A 15, and the conference server 20 can be provided to set up a conference call even by a CS terminal device. Moreover, the media policy stored in a respective media policy database 281 and the conference policy stored in a respective conference policy database 291 can be controlled from the CS network side.

Furthermore, an interface is provided between the MGCF 40 and the conference server 20. This interface is required for routing a call from the CS domain to the conference server via the MGCF 40. This interface can be a SIP ISC interface. As an alternative, the messages could also be routed through a Border Gateway Control Function (BGCF) and a CSCF using an Mj, Mi, and/or ISC interface. In view of the fact that the CS subscriber does not necessarily have IMS subscription, it is not needed to route the call through the IMS network to the conference server 20. When the call has been received by the conference server 20, the respective call leg for the conference is established by the conference server 20 based on a corresponding control signaling via the Mp interface to a MRFP (Media Resource Function Processor) 60 which acts as a mixer and which controls the MGW 50 via the Mb interface to provide the required media interworking. The MGW 50 is connected via a CS connection, e.g. a PSTN or a PLMN connection, to the participating mobile terminal 15.

Hence, by providing the new interfaces between the conference server 20 and the MGCF 40 and the participant, respectively, the SIP conferencing service can also be used by CS subscribers or terminals. Since the conference server 20 and the MGCF 40 may belong to the same operator network, the interface between these elements can also be implemented as a proprietary interface, or functionalities of the conference server 20 and the MGCF 40 can be integrated/implemented in the same network element.

In the following, a more detailed description of the signaling flows required for establishing a conference call and kicking out or excluding a participant, according to the preferred embodiment, is described with reference to FIGS. 4 and 5.

Figure 4:
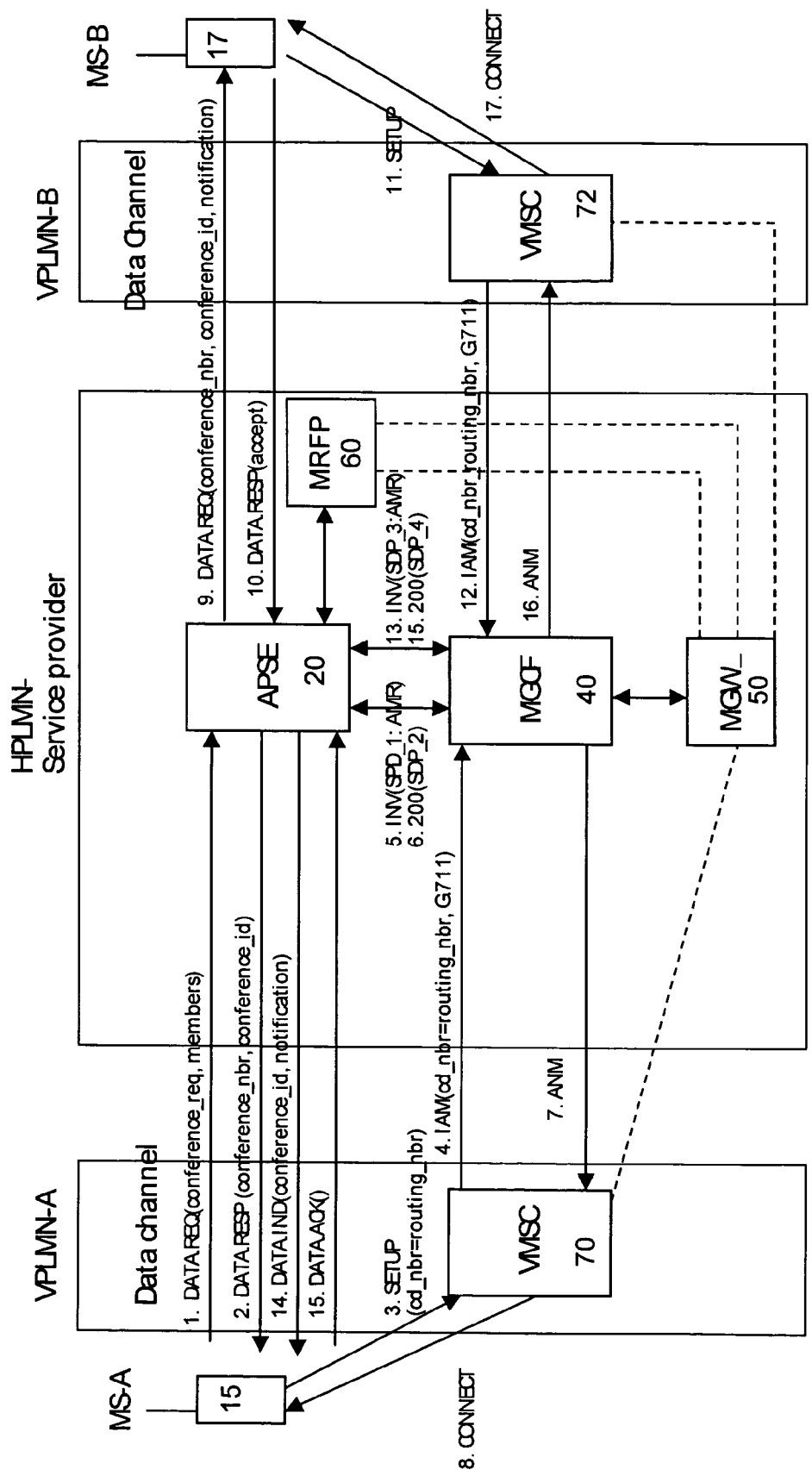
FIG. 4 shows a schematic diagram indicating signaling flows for initiating a new conference call according to the first preferred embodiment.

FIG. 4 shows a signaling flow for a conference creation by a user of the terminal MS-A 15. For simplicity reasons, a conference call between two participants is shown. However, more participants can be added and the principles described herein remain the same.

According to the above IETF Internet Draft, the IETF defines two types of conference participants, i.e., a conference-unaware and a conference-aware participant. Conference-unaware participants are not aware that they take part in a conference. The corresponding terminal device or UE views the session as a basic call session. A participant can join the conference by dialing a number and can be invited to a conference, but the participant has no means to control the conference, e.g. add more participants. Only conference-aware participants can control the conference. The procedure according to the embodiment allows a $2^{nd}$ generation CS subscriber to become a conference-aware participant of an IMS conference. In conventional systems, CS subscribers only can be conference-unaware participants in IMS.

According to FIG. 4, the host terminal MS-A 15 initiates a conference call request to the conference server (APSE) 20. The address of the conference application in the conference server 20 has been pre-configured to the terminal, e.g. in a service subscription stage. In the preferred embodiment, this address remains the same for all conference sessions created in this conference server 20. Of course, an option may be provided to change this pre-configured address based on a network-originated signaling to the mobile terminal MS-A 15.

The conference request is generated by the communication part 152 of the host terminal MS-A 15 and contains a list of members who should be called to the session. Hence, this conference request can be seen as a mass invitation operation in CPCP. By this operation, the initially mentioned requirement of easy and fast creation of conference calls from mobile terminals is fulfilled. It is also possible to create a conference first, i.e. reserve the conference E.164 number, and then start to invite the participants one-by-one, wherein however the benefit of fast and easy set-up with mass invitation is not achieved to the same extent.

The host terminal MS-A 15 may send additional session-related information together with the invitation or conference request. Such session-related information may define details such as the subject of the session, a picture that illustrates the subject, importance of the session, etc.

The conference server 20 contains the focus 24, conference policy function 29, media policy function 28, and conference notification function 22.

As already mentioned, the bearer for the direct connection between the CS host terminal MS-A 15 and the conference server 20 can be any data channel to define the Mt reference point, e.g. SMS, USSD, or WAP or HTTP over GPRS, etc.

The above described forwarding of the conference request to the conference server 20 is indicated by step 1 in FIG. 1.

In step 2, the allocation part 204 of the conference application in the conference server 20 arranges a dynamic E.164 routing number that routes the call to the conference server 20 in the home network (HPLMN) of the service provider. The routing number is kept reserved for the duration of the session. After the session has been finished, the routing number can be re-allocated. Hence, this dynamic E.164 number presents the conference-URI as specified in the above IETF Internet Draft in the CS domain. The number is unique and identifies the focus 24, which is responsible for this conference session. This conference routing number is returned to the host terminal MS-A 15 in a response message forwarded via the data channel.

In step 3, the host terminal MS-A initiates a CS call to the received conference routing number. This call is routed in step 4 via a visitor mobile switching center (VMSC) 70 of the visited network VPLMN-A of the host terminal MS-A 15 and via the MGCF 40 to the conference server 20. In particular, in step 5, the MGCF 40 sends a SIP INVITE request to the conference server 20. The INVITE request contains a local descriptor of the media resource. Furthermore, the MGCF 40 converts the E.164 number to a Telephone Uniform Resource Locator (Tel URL), which corresponds to the conference-URI that identifies the focus 24 in the conference server 20. In step 6, the conference server 20 reserves the media resources from the conference media mixer in the MGW 50. The descriptor of the reserved media resources is then sent back to the MGCF 40 in a SIP 200 response. In step 7, the MGCF 40 modifies the resources in the MRFP 60 and updates the remote media descriptor to the context. Then, the MGCF 40 sends an ISUP answer message ANM via the CS connection to the VMSC 70. In step 8, the host terminal MS-A 15 receives a CONNECT message from the VMSC 70 and the media path is connected two-way between the user or host terminal MS-A 15 and the conference media mixer at the MRFP 60 via the media interworking function at the MGW 50.

Then, in step 9, the conference server 20 sends a request to join to the conference to other indicated participants, e.g. the other terminal MS-B 17 of the CS network via the data channel. This join request contains the routing number, information about other participants currently in the session, and details of the conference, such as who is the initiator, when was the conference initiated, subject of the session, is the session moderated, etc. By this join request, each of the other participants is aware that the call is not a regular telephony call, but a conference session, and thus the join request fulfills the initially mentioned requirement that each participant should know that he or she has been added to the conference. Furthermore, the join request contains information about other participants in the session to thereby also fulfill the initially mentioned requirement that each participant should know who else is participating in the same conference.

In practice, all participants are requested to join simultaneously, even the creator or host of the conference, i.e. the host terminal MS-A 15. This ensures that the session is setup as fast as possible. The join request is also sent via the data channel, e.g. SMS, USSD, WAP or HTTP.

In step 10, the other participant MS-B 17 accepts the join request. At this point, the conference notification function 22 of the conference server 20 can notify the other participants, e.g. the host terminal MS-A 15, that a new participant has accepted to join the conference session. Similarly, if one participant rejects the request, the other participants are notified.

In step 11, the other participating terminal MS-B 17 makes a call to the received conference routing number. This CS call is routed via another VMSC 72 of the other visitor network VPLMN-B of the other participating terminal MS-B 17 to the MGCF 40. In step 12, the call is routed as an ISUP initial address message (IAM) to the MGCF 40. In response thereto, the MGCF 40 reserves the media resources at the MGW 50. Then, in step 13, the MGCF 40 sends a SIP INVITE request to the conference server 20. In response thereto, the conference server 20 reserves in step 14 the resources from the MRFP 60 and adds the media streams together in this conference mixer. The conference server 20 sends notifications to the other participants that a new participant has joined the conference. Thereby, the initially mentioned requirement that each participant has to know if others join the conference is fulfilled.

In step 15, the MGCF 40 modifies the resources in the MGW 50 and updates the remote media descriptor to the context. Then, the MGCF 40 sends an ISUP ANM message to the second VMSC 72 of the other participant in step 16. The terminal device MS-B 17 of the other participant receives a CONNECT message from the VMSC 72 in step 17 and the media path is connected two-way between the user and the mixer. Thereby, a conference call between the CS terminals MS-A 15 and MS-B 17 is established via the ISM conference server 20, such that IMS services can be provided to the conventional CS terminals MS-A 15 and MS-B 17.

Figure 5:
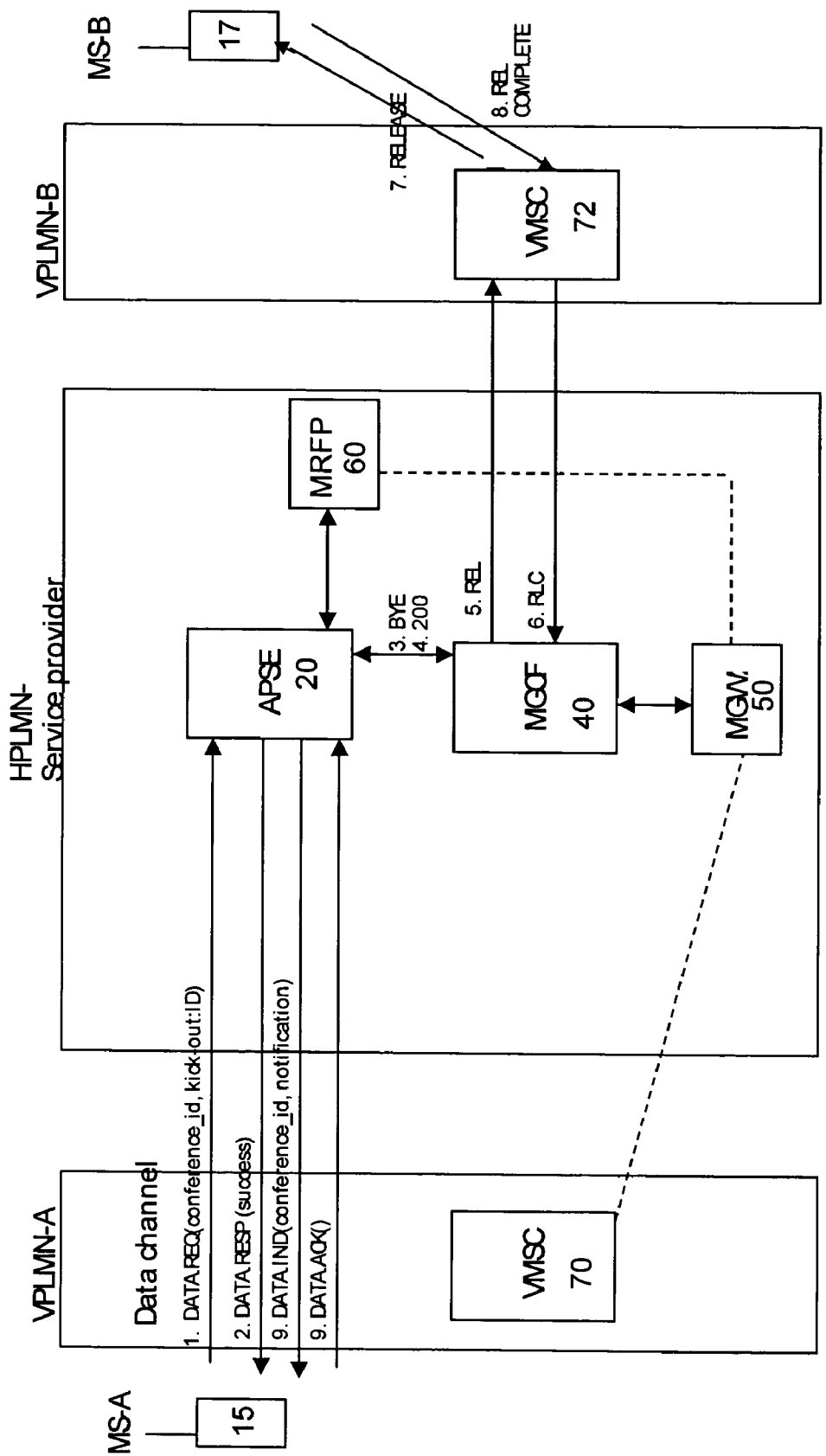
FIG. 5 shows a schematic diagram indicating signaling flows for kick-out of a participant according to the first preferred embodiment.

FIG. 5 shows a diagram similar to FIG. 4, wherein however signaling flows for a kick-out procedure of a participant are shown.

In step 1, the host terminal MS-A 15 sends a request to kick-out the other participant MS-B 17 from the conference session. This kick-out request contains the identification (ID) of the MS-B 17 and of the conference session. Also this kick-out request is forwarded via the data channel. However, it should be noted that the kick-out request is not limited to the session creator or host. The conference policy and more detailed the membership policy may describe specific roles in the conference session, in particular who is allowed to request certain roles.

In step 2, the conference server 20 acknowledges the receipt of the kick-out request. Then, in step 3, the conference server 20 sends a SIP BYE request towards the other participant MS-B 17 via the MGCF 40, which is acknowledged by the MGCF 40 in step 4. In step 5, the MGCF 40 sends a ISUP RELEASE request to the second VMSC 72 which acknowledges the request in step 6. In step 7, the second VMSC 72 sends the RELEASE request to the other participant MS-B 17. The other participant MS-B 17 acknowledges this request in step 8 by a REL COMPLETE response. Finally, in step, 9 the conference server 20 sends a notification to all participants that one participant has left the conference. This fulfills the initial requirement that each participant should know if others leave the conference during the session.

Thereby, an enhanced kick-out service can be provided to conventional CS terminals. It is noted that CPCP also enables a kick-out request for multiple participants at once, which is called a mass ejection.

As already mentioned, to provide the above enhanced conference service to conventional CS terminals, a special conference call application is required in the conference-aware terminals MS-A 15 and MS-B 17. This application comprises the communication part 152, 172 which uses the data channel to communicate with the conference server 20 and which communicates with the telephony application 154, 174 to initiate CS calls towards the conference server 20. One way to implement this conference call application is to provide a native client that integrates smoothly to the existing terminal functionalities like contacts, e.g. phonebook, and telephony application 154.

Another option is to use a MIDlet technology for the implementation of the conference call application. A MIDlet is a mobile information device application. In particular, MIDlets are JAVA applications that run on mobile terminals or other devices compliant with the reduced JAVA version called J2ME. A MIDlet with support of Personal Information Management (PIM) Application Programming Interface (API) can access to the contacts and read the conference participant's names and numbers from there. The corresponding protocol MIDP 2.0 allows the MIDlet to initiate a call to the conference server 20. The MIDlet can easily print the shared information, such as session subject, icon, etc., to the screen of the terminal device. PIM API allows to store the shared participant's details, e.g. in vCards, in the phone book. A MIDlet with support of wireless messaging (WMA) API can send and receive SMS messages. The MIDlet can be even initialized by an SMS reception.

As already mentioned, many options are given for the bearer of the data channel. USSD is fast and reliable but is not widely deployed in networks. In contrast thereto, SMS is supported in every GSM network, but is a store and forward type of service and thus might require more transmission time which might be disadvantageous for real-time communications. Furthermore, SMS messages are limited in size to 160 characters per message. WAP over GPRS is fast, but opening the GPRS session might take too long for real-time communication. Moreover, GPRS roaming is not yet widely supported. In this respect, it also has to be considered that sending of a WAP push request utilizes SMS messaging and thus has the same disadvantage regarding slowness. However, as the size of the packet data units (PDUs) in the data channel is quite small, SMS is a viable option for the data bearer. The store and forward problem can be prevented by bypassing the serving mobile switching center (SMSC). Nevertheless, it is to be noted that any of the above data bearer options can be used as a feasible option for the implementation of the present invention.

According to a second preferred embodiment, the CS terminals 15, 17 are adapted to use SIP (Session Initiation Protocol) to control conference services. This would be the case e.g. when the mobile terminal MS-A 15 has subscribed to the IMS, but for some reason cannot use Voice over IP (VoIP) for voice calls, e.g., because Release 5 IMS is used or the mobile terminal MS-A 15 is roaming in the CS network. In this case, the mobile terminal MS-A 15 may send a SIP INVITE request to the conference server 20 using the data channel or data connection dch and in response it receives the conference number to be used in the CS network side. Now, the mobile terminal MS-A can start inviting other participants by sending a bunch of SIP REFER requests to the conference server 20, each indicating one terminal device to which the conference invitation should be sent. The actual media session is however the CS call.

In the second preferred embodiment, SIP/SDP (Session Description Protocol) extension are used to carry CS specific information from the mobile CS terminal MS-A 15 to the conference server 20. This CS specific information may include an Indication from mobile terminal that a CS call or connection is needed. The conference routing or phone number is then carried in the response. In particular, the conference server 20 allocates the conference phone number, e.g. an E.164 number, from the predefined range of numbers and returns it, e.g. as a tel URI, to the mobile terminal MS-A 15.

The mobile terminal MS-A 15 uses the conference number to initiate the CS call and invites other participants, e.g., by sending REFER requests if the other participants are registered to IMS. If the host terminal MS-A 15 does not know whether the invited terminal MS-B 17 is a SIP-capable CS user, the SDP extension in an INVITE request from the application server 20 to other MS-B may carry a proprietary "CS-capability" extension, which would be accepted by the other terminal MS-B 15 if it is CS-capable. Thereby, the host terminal MS-A 15 can be informed about the SIP capability of the other terminal MS-B 17.

The CS bearer and the SIP dialog are tied together in the conference server 20 which is adapted to handle and synchronize actually two SIP dialogs that both are related to the CS session of the host terminal MS-A 15. A dynamic routing number pool and allocation can be arranged. The conference URIs can be created dynamically, while the routing of dynamically created (service) URIs can be handled in IMS Release 6. Roaming can be based on IMS or GPRS. The P-CSCF can be located also in the home network. Signaling can be based on the 3GPP specification TR 29.847 v 0.1.0 and IETF draft "draft-johnston-sipping-cc-conferencing-01".

The conference server 20 is adapted to handle CS-specific SDP/SIP extensions, e.g. proprietary SDP extensions, and/or to combine and/or synchronize two SIP dialogs concerning the same media session. Also, the mobile terminals are adapted to handle CS-specific SIP/SDP, and to handle the SIP dialog and corresponding CS bearer. In particular, DTM or WCDMA Multi-RAB may be needed.

The MGCF 40 and the conference server 20 may communicate through the ISC/SIP interface or through already existing Mi, Mj and ISC interfaces.

Figure 6:
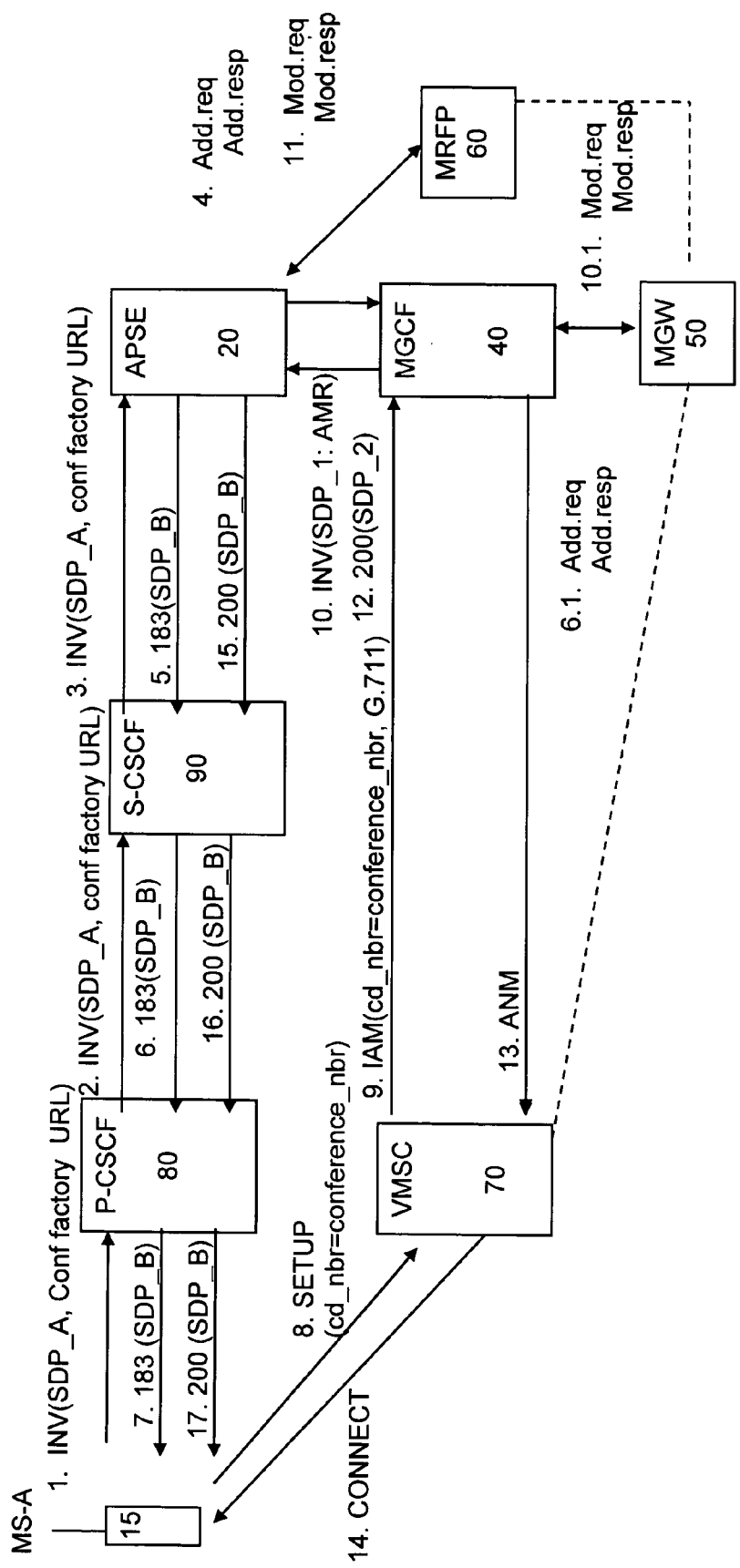
FIG. 6 shows a schematic diagram indicating signaling flows for initiating a new conference call according to a second preferred embodiment.

FIG. 6 shows a schematic diagram indicating signaling flows for initiating a new conference call according to the second preferred embodiment.

In steps 1 to 3, the host terminal MS-A 15 sends an INVITE request via a P-CSCF 80 and an S-CSCF 90 of the IMS to the conference server 20. The required address of the conference server 20, e.g. Conference Factory URL, can be pre-configured to the host terminal MS-A 15 or fetched using some standard mechanism. SDP may contain the offered medias. The host terminal MS-A 15 might request media for voice and also e.g. for a unidirectional video stream which is carried in the PS domain. The SDP may contain a special information that the bearer for audio will be allocated from the CS domain.

In steps 4 to 7, the conference server 20 reserves conference resources for the SWIS media from the bridge. Voice resources are not reserved at this point. The conference server 20 sends a SIP 183 response back to the host terminal MS-A 15. The P-CSCF 80 authorizes the committed QoS for SWIS. The Contact header of the 183 response contains a temporary conference URL. This URL is a TelURL and E.164 number in order to reserve the bearer for voice from the CS domain.

In steps 8 to 10, the host terminal MS-A 15 sends a GSM Setup request towards the received conference number. The number leads to the conference server 20 in the home network. The MGCF 40 reserves media resources from IMS-MGW 50 and sends an INVITE request to conference server 20. The SDP in the INVITE request may contain a list of audio codecs supported by the IMS-MGW 50. The conference server 20 needs to be able to assign the new SIP session to the old session based on the conference number.

Then, in steps 11 to 14, the conference server 20 modifies the resources in the bridge to contain the correct audio codecs and the remote IP address. The descriptor of the reserved media resources is sent back to the MGCF 40. Note that usually SIP 183 Session Progress is used for this purpose, the flow is simplified in FIG. 6. User plane for voice has been connected then.

Any required SIP PRACK and UPDATE requests are not shown in FIG. 6.

Finally, in steps 15 to 17, after the conference server 20 has received an UPDATE request and modified the resource reservations accordingly, it sends a final SIP response 200OK for the INVITE request. The Contact header contains the conference URL, which is a Tel URL and E.164 number. This number is later on used to identify this particular conference session. Furthermore, the Contact header may also contain a isfocus parameter to indicate that the address is for a conference call.

For subscription, the mobile terminal MS-A 15 may subscribe the state of the conference session. To achieve this, a SIP SUBSCRIBE request is sent to the Conference URL. If the conference server 20 accepts the subscription, it sends the current state of the conference session. This state is XML-coded inside a SIP NOTIFY message. The mobile terminal MS-A 15 acknowledges the received NOTIFY message. After this, the conference server 20 always sends a NOTIFY message to the subscribed mobile terminal MS-A 15 when the state of the conference changes.

A new member can be added to the conference by sending a SIP REFER request to the conference server 20. The request URL contains the conference URL. The Refer-To header contains the SIP URL of invited user, e.g. the mobile terminal MS-B 17. The Method parameter in the Refer-to header contains the value "Invite". If the conference server 20 accepts the request, it notifies the requesting terminal MS-A 15 that the session towards the invited terminal MS-B 17 is in Trying state. Then, the conference server 20 reserves the media resources from the MRFP 60 for other medias except audio, and sends a SIP INVITE request to the invited terminal MS-B 17. The INVITE request may contain an isfocus parameter in the Contact header that tells to the invited terminal MS-B 17 that the call is a conference call. The Contact header contains the conference URL which is a Tel URL and E.164 number. The INVITE request can contain also other information related to the session, e.g. subject, icon, importance, etc., which can be stored in the conference server 20 or sent in each REFER request. The user B of the invited terminal MS-B 17 is now able to accept or reject the conference call request.

If the user B accepts the call, the invited terminal MS-B 17 sends a SIP 183 response to the application server 20. The SIP 183 response may contain the media supported by the invited terminal MS-B 17. The conference server 20 modifies the codecs and the remote IP address in the MGCF 40 for other media except audio.

Then, the invited terminal MS-B 17 initiates a CS call towards the Conference number. The MGCF 40 reserves resources from the IMS-MGW 50. It sends a SIP INVITE request to the conference server 20, which contains the supported audio codecs and the local IP address in the MGW 50. In response thereto, the conference server 20 modifies the resources in the MRFP 60 to contain the supported audio codec and the remote IP address in IMS-MGW 50. The conference server 20 sends a SIP 200OK response with the media information back to the MGCF 40. Then, the invited terminal MS-B 17 receives a GSM CONNECT message.

Once the conference server 20 receives the INVITE request from the MGCF 40, it needs to assign the SIP session to the original session that was initiated when the conference server 20 received the REFER request from the inviting terminal MS-A 15. At the conference server 20, it may also be authorized that the invited terminal MS-B 17 is allowed to join to the conference.

Once the invited terminal MS-B 17 has received an UPDATE request from the conference server 20, it sends a SIP 200 OK response to the conference server 20. The conference server 20 can modify the media resources in the MGCF 40 according the SDP in the 200 OK response. At this point both audio and other media (e.g. SWIS video) are connected with the other participants in the MRFP 60.

Finally, the conference server 20 sends a NOTIFY request to the inviting terminal MS-A 15 that tells that the session to the invited terminal MS-B 17 is in confirmed state.

After this the invited terminal MS-B 17 can subscribe the state of the conference as mentioned above. In the notification, the user B receives the current state of the conference, e.g. the list of other participants. Kick-out of a participant can be done in a similar manner, except that the REFER request contains value "BYE" in the method parameter of the Refer-to header. This causes the conference server 20 to send a BYE request to the member.

In a further alternative, a conference host, e.g. MS-A 15, can request another terminal device, e.g. MS-B 17, to join the conference by sending a REFER message to the invited terminal device MS-B 17 instead of conference server 20. The REFER message then contains a conference address which can be either a conference URL or E.164 number. If the REFER message contains a conference E.164 number, the invited terminal device MS-B 17 establishes a circuit switched call leg towards the conference server 20 as described before. If the REFER message contains a conference URL instead, the invited terminal device MS-B 17 first sends an INVITE message to the conference server 20 using the received conference URL. The conference server 20 then responds to the invited terminal device MS-B 17 with an allocated conference E.164 number, which the invited terminal device MS-B 17 can use to establish a circuit switched call leg towards the conference server 20 as described before.

As an alternative or additional option for both the first and the second embodiments, the call set-up procedure may be initiated by the conference server 20. Then, the participants or CS terminals are merely informed by the received conference number that there is a call coming soon from that number and that it is a conference call. This server side initiation option may as well be used in combination with the terminal side initiation option and both options may be based on different kinds of commands. Moreover, the invention can be enhanced by adding support of other media components, like non-real time video over GPRS, application share, or chatting during conference session.

In the following, a third preferred embodiment is described which enables a SIP UE connected to the IMS domain via IP connectivity to use the CS domain as bearer transport similarly as PS domain is used in 3GPP IMS. This enhancement requires modifications to the IMS and end user's SIP-capable terminal device.

In the following, a first example of the third preferred embodiment is described based on a normal point-to-point SIP voice session using the CS domain as bearer for actual speech. This example case is taken as a basis to describe required changes to the IMS and UEs. It should be noted that no changes are required to the CS domain, which is nowadays very important issue to take into account.

Figure 7:
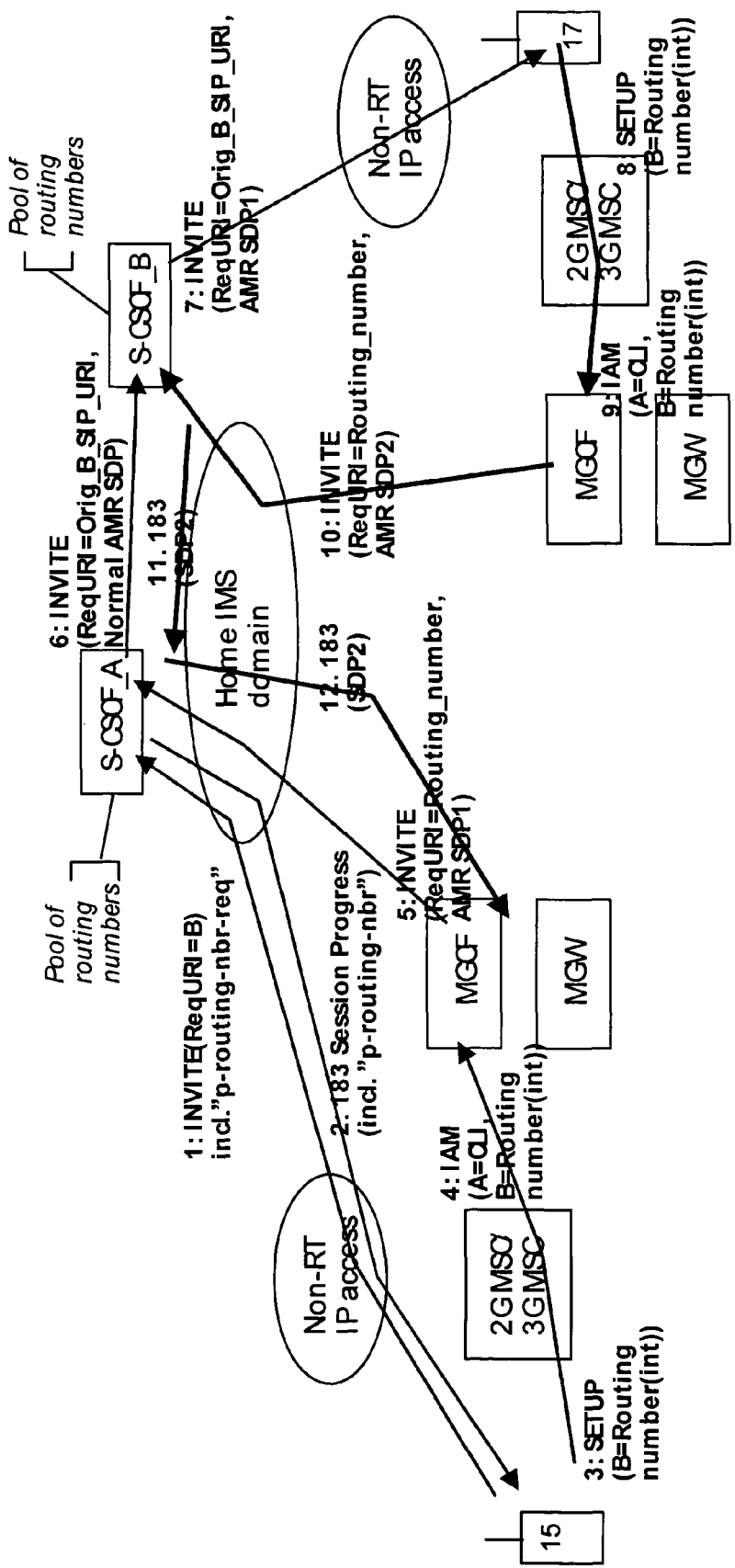
FIG. 7 shows a schematic diagram of an example of SIP session establishment between two IMS subscribers according to a third preferred embodiment.

FIG. 7 shows a schematic diagram indicating an originating-side SIP session establishment according to the third preferred embodiment;

The IMS subscribers A and B both have 3GPP SIP-capable UEs 15, 17. For sake of simplicity same home IMS domain applies for both subscribers.

The IMS subscriber A is currently roaming in a GSM PLMN which does not support conversational traffic class and thus voice over IP is not possible. IMS subscriber A also has SIP-capable UE 15 having possibility to have simultaneous IP connection while having voice call over CS domain. IMS subscriber B has UE 17 which is capable of having IP connectivity over WLAN (Wireless Local Area Network) radio access and GSM for voice calls. Such terminal could be e.g. modified PC card (within laptop) having wireless or wired hands-free set for voice. In this case IP-level connectivity has been gained e.g. by using Virtual Private Network (VPN) IP Security (IPSec) connection in order to gain access to home network.

The IMS subscriber A calls to the IMS subscriber B and wants to have voice call in order to quickly verify some issues. Both subscribers have had earlier successfully registered to own IMS domain. The registration procedure is modified as follows:

During the registration procedure, the IMS subscriber A's UE 15 had possibly issued a REGISTER method with an indication that the real-time QoS is not supported. The lack of real time QoS may be due to terminal capability or configuration and/or access network capabilities or configuration. This indication could be for instance a new header (e.g. new p-header) or combination of some existing header (like p-access-type) with some additional information. The usage of user plane resources on the originating and terminating terminals is independent and the usage is defined during the session setup.

Similarly, the IMS subscriber B's UE 17 had possibly issued REGISTER method with new header indicating the lack of sufficient QoS. In order to verify that all SIP servers understand the content of p-header, REGISTER method and all other methods which are enhanced by this invention should contain a Requires-header having the new required header. It is noted that headers that are referred by Require header should be defined in standards-track RFx's. Therefore the requirement to have Require-header in use should be timed together with possibly addition to appropriate RFx.

The P-CSCF location, whether it is in the home network or in the visited network, is transparent for this type of terminals. The P-CSCF has to have the capability of analysing the SDP-indication that the CS-network is used for user-plane setup. If the CS-network is used for user-plane setup the Go interface usage shall not be applied. It is noted that the assumption that the IMS domain is aware of whether or not QoS is sufficient for voice over IP will develop need for updating this information whenever the situation changes. Such event can be e.g. when end user's UE is moving from 2G GPRS into the 3G packet core access during idle-mode selection process, which is capable to support sufficient QoS.

The P-CSCF forwards the REGISTER method towards the S-CSCF of IMS subscriber. This shall also carry same knowledge of the status of access network. After the registration has been accepted, the SIP acknowledgement 200 OK is returned to the UE. In case the serving IMS domain also supports these procedures, the IMS domain has included new p-header in the returned method body. If this new p-header is not supported by IMS, then it is the responsibility of the UE to not invoke SIP sessions which would require voice over IP capability.

After having successfully executed the above registration procedure, the IMS subscriber A dials normally by using a SIP URI. An INVITE method which establishes SIP dialog between IMS subscriber A and B is sent in step 1 by IMS subscriber A's UE 15. This INVITE method comprises in addition to other required header additional information "p-routing-nbr-req" which purpose is to inform the IMS domain to return a specific routing number back to the IMS subscriber A's UE 15 in order to open bearer connection through CS domain. This information can be either embedded into an SDP offer or as some completely new header, e.g., p-header.

The INVITE method is routed through the P-CSCF to an S-CSCF_A which is located physically in the home network of IMS subscriber A. The S-CSCF_A will try to allocate a routing number, e.g. a E.164 number, from a pool of numbers dedicated for this purposes. In this example when the IMS subscriber A's home network is a network of a specific operator located in Finland, the routing number may be part of the numbering plan of this specific operator in international format. The routing number may be in international format in order to enable calls to be routed from other countries correctly to the home country. Example of such routing number could be +35840900001, having type of number field set as "International".

The S-CSCF_A of the IMS subscriber A will return the allocated routing number "p-routing-nbr" in step 2 to the IMS subscriber's UE 15 in a proper 1xx method, e.g. 183 Session Progress. After receiving the method, the UE 15 analyses the delivered routing number and makes sanity checking to the received routing number in order to verify whether or not it is possible to encode that into SETUP message's called party number information element, according the 3GPP specification TS 24.008. If the routing number is not in such format, then the UE 15 shall release the session establishment attempt by issuing SIP CANCEL method towards the IMS domain.

In case the delivered routing number seems to be valid, the UE 15 tries to establish in step 3 a normal CS voice call via the existing CS domain which may be in this example for IMS subscriber A a GERAN (GSM/EDGE Radio Access Network). SIP session establishment at this point is on hold.

The CS call is routed within CS networks, e.g. via at least one 2G and/or 3G Mobile Switching Center (MSC) all the way to the home network of the IMS subscriber A. At some point of time, the CS call attempt will be routed as a Initial Address Message (IAM) to a Media Gateway Control Function (MGCF) (step 4). The MGCF will control an IMS-Media Gateway in order to convert the Time Division Multiplexed (TDM) speech connection having G.711 speech codec to voice over IP having UMTS Adaptive Multirate Codec (AMR) and vice versa. Then, the MGCF will eventually establish a new SIP session attempt towards the S-CSCF_A addressed by the routing number (step 5). The S-CSCF_A which receives the SIP session establishment, i.e. INVITE method, from the MGCF may be the same that is controlling the (main) SIP session of the IMS subscriber in question.

After the S-CSCF_A has received the INVITE from the MGCF, it will resolve based on the used routing number, and possibly on other headers such as a From-header, the original SIP session. The S-CSCF_A which has allocated the routing number is at this point of time free to release the number into re-use. This way the number range or the size of routing number pool can be kept at optimum.

After the CS-call setup has been completed, the UE 15 may send a 183 Session Progress to the SIP-session establishment for indicating the start of alerting. In case SIP pre-conditions are in use, then alerting is not done before all required pre-conditions are fullfilled in the originating side and an UPDATE method may be issued by the originating side UE 15 towards terminating side UE 17. Information regarding the pre-condition is maintained in the Session Description Protocol container by using qos-attribute.

After this, the establishment of original SIP session may continue from S-CSCF_A towards subscriber B's network. In this case, the subscriber B addressed with the SIP URI is located in the same network and thus network hiding in not required.

An INVITE method is send in step 6 to the local I-CSCF (not shown) in order to assign an S-CSCF_B for the IMS subscriber B. During this procedure, the I-CSCF makes a location enquiry via a Cx interface to the Home Subscriber Server (HSS) of the IMS subscriber B. The HSS will return the address information of the S-CSCF_A which is after this contacted by the I-CSCF.

The actual content of the INVITE method will be taken from the INVITE which has been received from the IMS subscriber A's UE 15. However with one exception. The Session Description Protocol which was received from the UE 15 will be replaced by one received from the MGCF. This way, an UMTS AMR codec with suitable settings will be available for voice over IP connection.

The INVITE method will be received by the IMS subscriber B's S-CSCF_B. The S-CSCF_B in this case will perform whatever tasks necessary for service execution of IMS subscriber B. If session establishment is allowed to continue normally, the S-CSCF_B will forward the INVITE method in step 7 towards the IP endpoint which was stored during the registration of the IMS subscriber B. The S-CSCF_B checks based on the information that was received during registration or afterwards during the update of information whether or not the IMS subscriber B's UE 17 is capable of receiving voice over IP calls as such or whether the CS domain should be used instead.

In case the session will be established normally via the existing procedures and voice is transported over IP, then no special requirements exists. However if voice cannot be transported over IP, then the S-CSCF_B allocates a routing number and encodes that number into a suitable new header (e.g. p-header) or into an SDP container of the INVITE method. Optionally but not necessarily also another new header (e.g. p-header) could be encoded to the INVITE method to indicate to the UE 17 of the IMS subscriber B that voice shall be connected over the CS domain instead.

The INVITE method will be received by IMS subscriber B's UE 17. The UE 17 will analyse from the received INVITE method or/and by other means such as recognizing the access where UE 17 is currently roaming and what kind of connectivity it should use. In case the information in INVITE will result in proper action e.g. when for some reason the S-CSCF_B has instructed the UE 17 to use the CS domain but the UE 17 is not capable to do this, then the INVITE shall be rejected and a new registration procedure shall be started in order to correct the situation.

If the INVITE is in-line with the situation and the CS domain can be used, i.e. the end user does not have a simultaneous CS connection already active or other, then the UE 17 shall make sanity checking whether or not use of received routing number is possible. This checking is similar as done earlier in IMS subscriber A's UE 15.

In case routing number does not seem to be valid, then the session establishment shall be released by replying with CANCEL or other more impropriate error message.

In case the delivered routing number is valid, then the UE 17 establishes the CS call by sending a SETUP CS call in step 8. The CS domain will route the call based on the routing number. The CS call is routed via at least one 2G MSC and/or 3G MSC within CS networks all the way to the home network of the IMS subscriber B. At some point of time, the CS call attempt will be routed in step 9 as an IAM to an allocated MGCF. The MGCF controls an IMS-Media Gateway in order to convert Time Division Multiplexed (TDM) speech connection having G.711 speech codec to voice over IP having UMTS AMR and vice versa. In step 10, the MGCF will eventually establish a new SIP session attempt towards the S-CSCF_B addressed by the routing number. The S-CSCF_B which receives the SIP session establishment, i.e. INVITE method, from the MGCF is the same that is controlling the (main) SIP session of the IMS subscriber in question.

After the S-CSCF_B has received the INVITE from the MGCF, it will resolve based on the used routing number, and possibly from other headers such as From-header, the original SIP session. Then, the S-CSCF_B returns a 183 session Progress in steps 11 and 12 to the MGCF allocated to the originating UE 15. The S-CSCF_B which has allocated the routing number is at this point of time free to release the number into re-use. This way the number range or the size of routing number pool can be kept at optimum.

In case for some reason the CS connection cannot be established through the CS networks or the CS connection is cleared during the active voice session, the UE 17 will receive a DISCONNECT message with appropriate cause value. If this event occurs, then the SIP session shall be released as well either with appropriate error message or CANCEL depending on whether the SIP session has been active or not.

Figure 8:
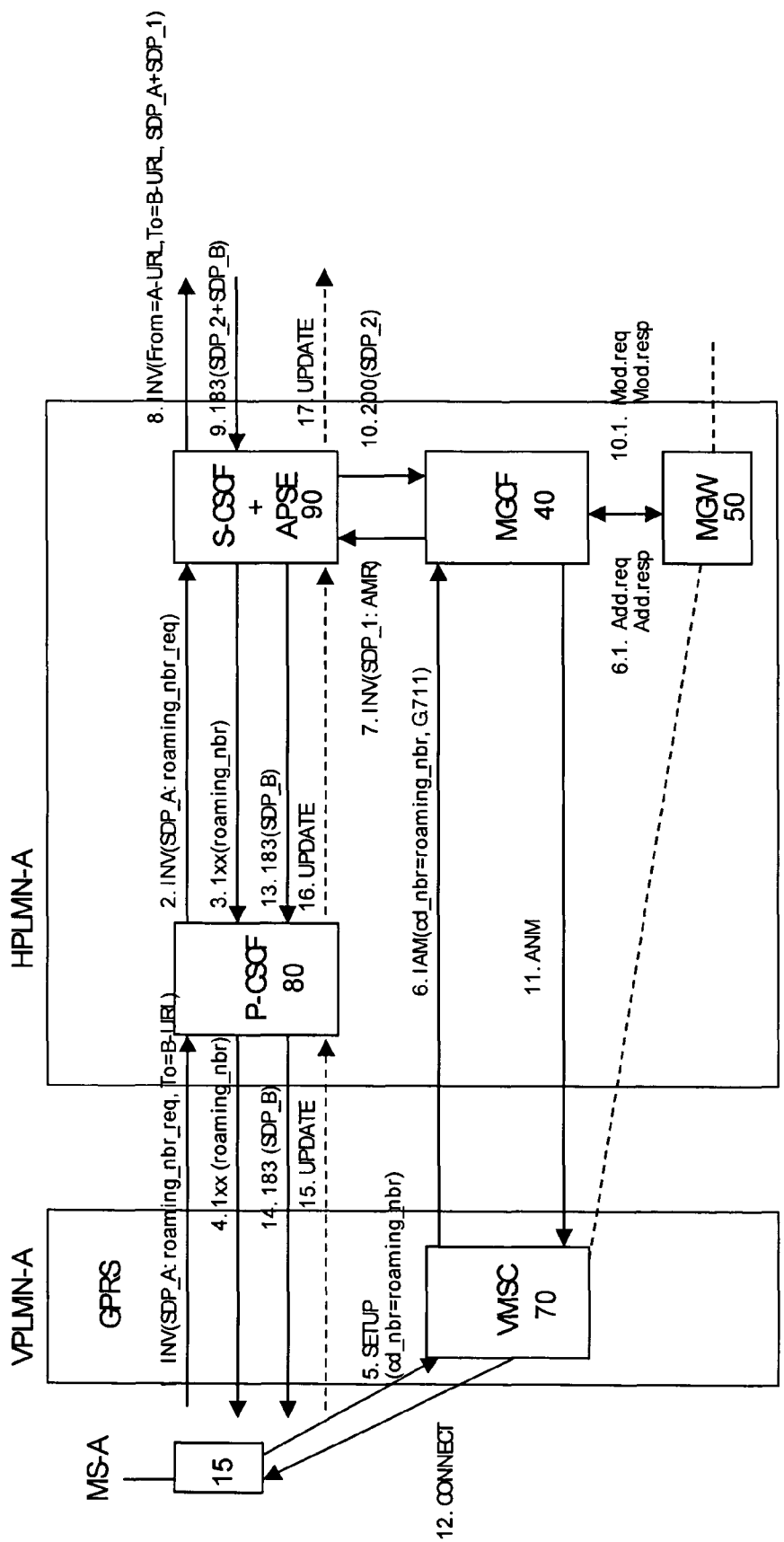
FIG. 8 shows a schematic diagram indicating an originating-side SIP session establishment according to the third preferred embodiment.

FIG. 8 shows a schematic diagram indicating in more detail an originating-side SIP session establishment according to an example of the third preferred embodiment, similar to FIG. 7. However, in contrast to the procedure of FIG. 7, an additional UPDATE method is used in steps 15 to 17 to indicate end-to-end that all pre-conditions are fullfilled and user plane connections are reserved before terminating party is alerted. Finally, at the originating side, the S-CSCF 90 will perform all IMS subscriber A's services.

When the session is terminated by either parties, both CS domain connections are cleared as well from the direction of the respective S-CSCFs.

Figure 9:
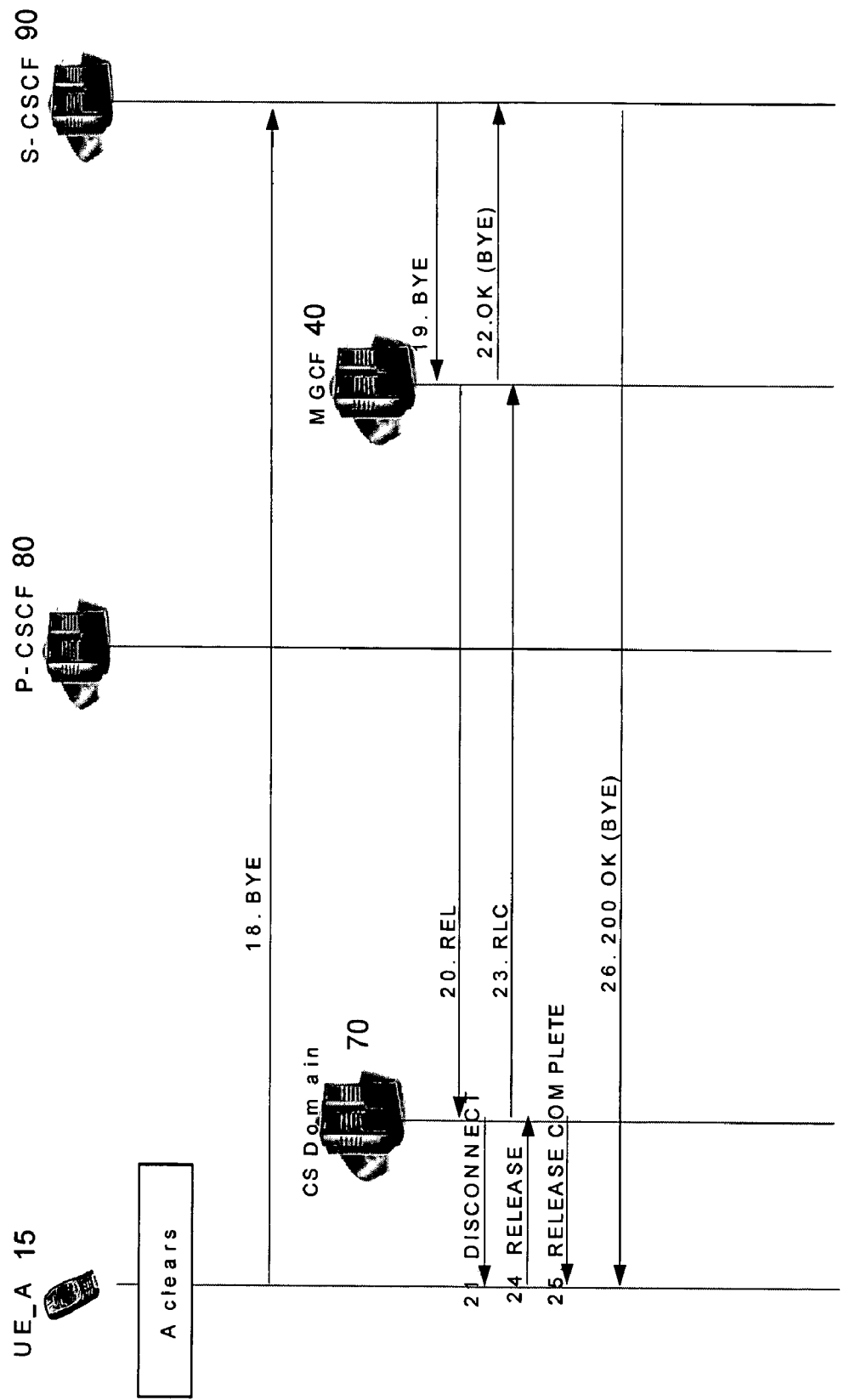
FIG. 9 shows a schematic signaling diagram indicating how originating-side SIP session is cleared by a calling party, according to the third preferred embodiment.
Figure 10:
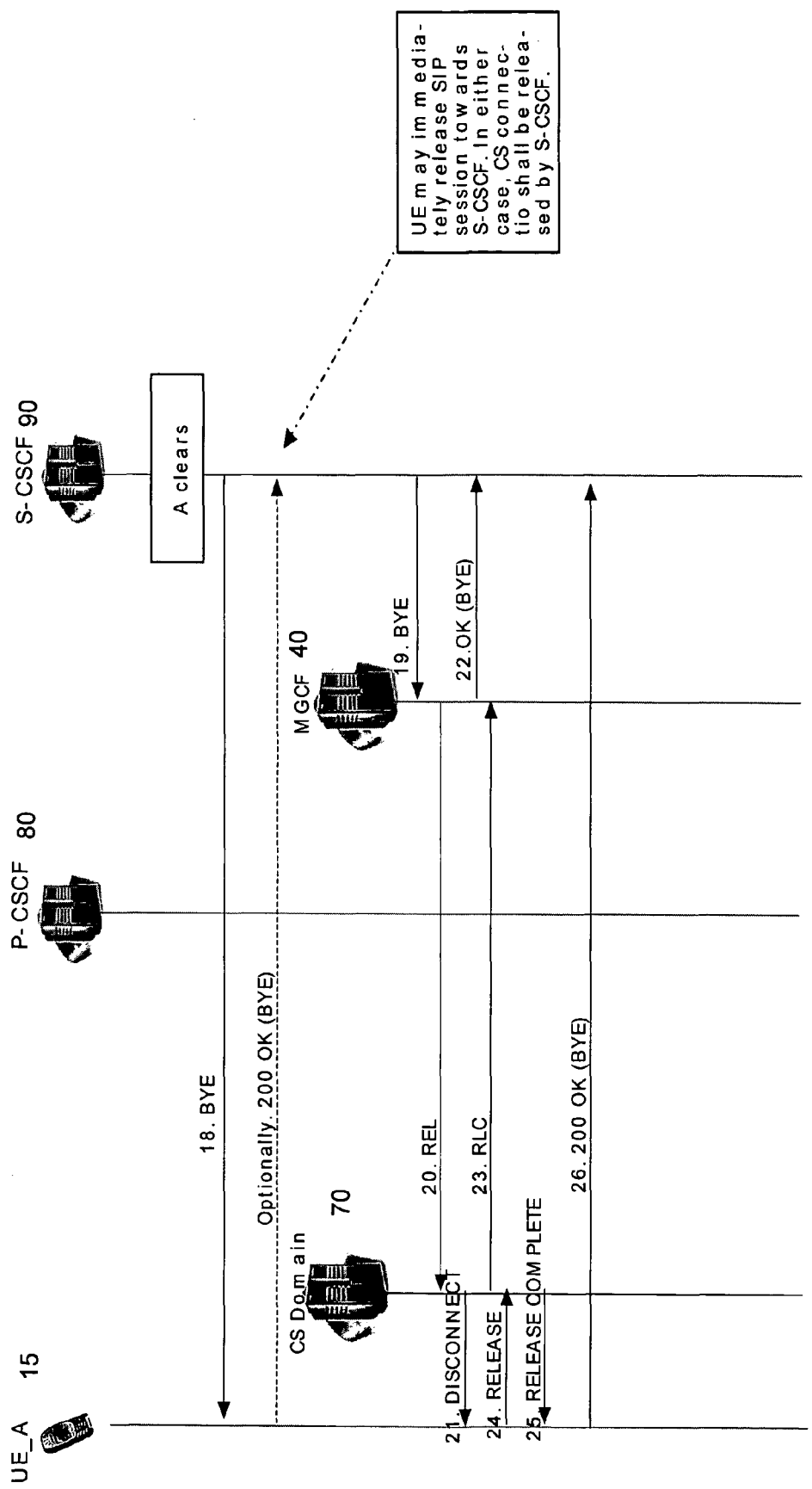
FIG. 10 shows a schematic signaling diagram indicating how originating-side SIP session is cleared by called party, according to the third preferred embodiment.

FIGS. 9 and 10 show schematic signaling diagrams indicating how an originating-side SIP session is cleared by a calling party and by a called party, respectively, according to the third preferred embodiment.

According to FIG. 9, the calling or originating-side UE 15 clears the session and thus sends a SIP BYE in step 18 directly to the S-CSCF 90 which in response thereto also sends a SIP BYE in step 19 to the MGCF 40. In response thereto, the MGCF 40 generates an REL message and sends it in step 20 to the CS Domain, e.g. the VMSC 70, which converts the REL message into a DISCONNECT message and sends it in step 21 to the calling UE 15. As corresponding acknowledgments, the MGCF 40 responds in step 22 with a SIP 200 OK or BYE to the S-CSCF 90, the CS Domain, e.g. the VMSC 70, responds in step 23 with an RLC message to the MGCF 40, and the calling UE 15 responds in step 24 with a RELEASE message to the CS Domain, e.g. the VMSC 70. In response thereto, the CS Domain, e.g. the VMSC 70, sends in step 25 a RELEASE COMPLETE to the calling UE 15, and finally the S-CSCF 90 directly responds to the calling UE 15 with a SIP 200 OK or BYE (step 26).

According to FIG. 10, in response to a corresponding request from the called UE 17, the S-CSCF 90 clears the session and thus sends a SIP BYE in step 18 directly to the calling UE 15 which may immediately release the SIP session towards the S-CSCF 90, or wait until the CS connection is released by the S-CSCF 90, which is done by the S-CSCF 90 in either case. To release the CS connection, the S-CSCF 90 sends a SIP BYE in step 19 to the MGCF 40, and then, the same steps 20 to 26 as described in connection with FIG. 9 are performed.

Figure 11:
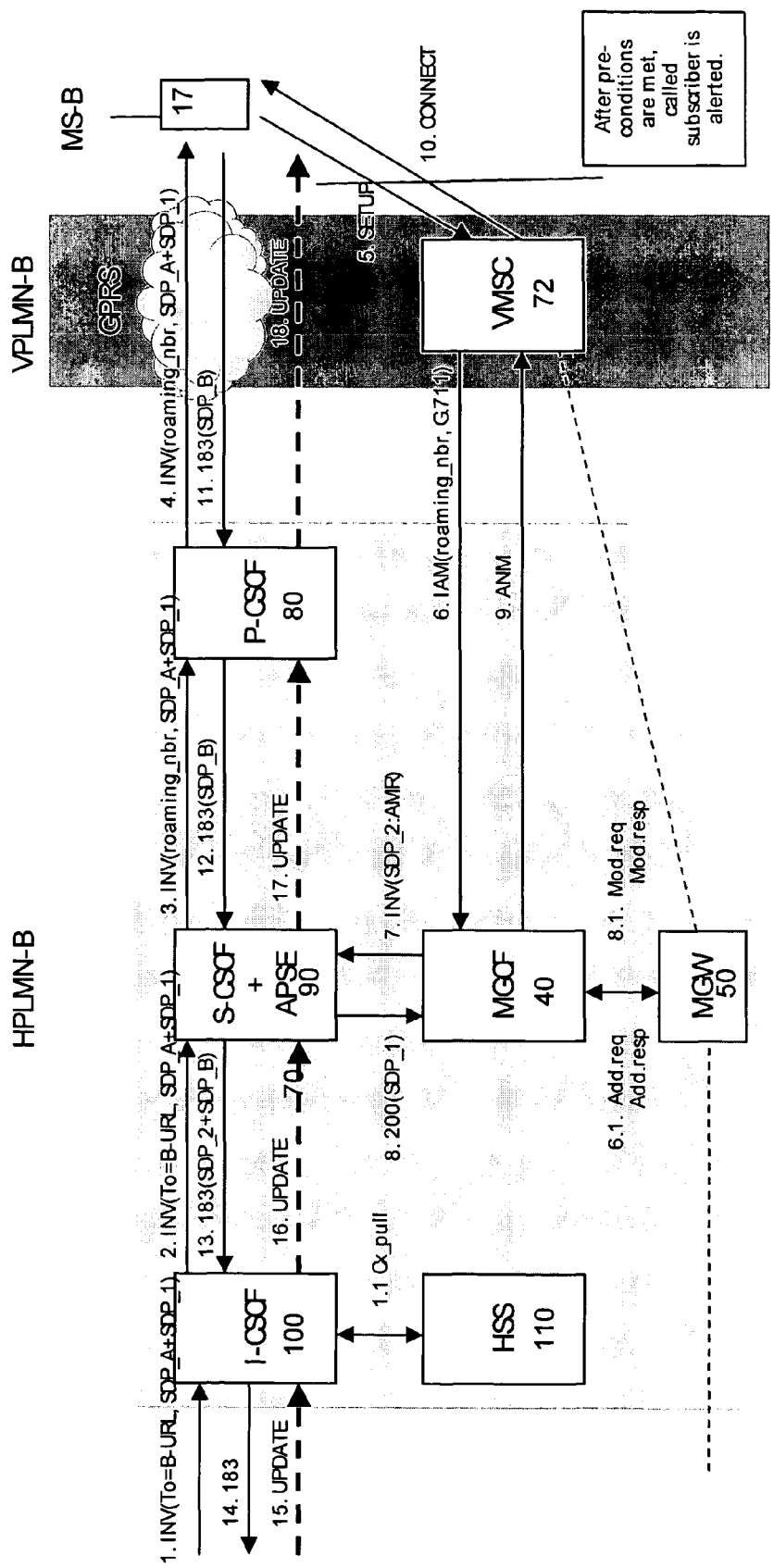
FIG. 11 shows a schematic diagram indicating terminating-side SIP session establishment and tear-down according to the third preferred embodiment.

FIG. 11 shows a schematic diagram indicating terminating-side SIP session establishment and tear-down according to another example of the third preferred embodiment. Here, the UE 17 at the terminating side is located in or connected to a CS domain. Therefore, the INVITE issued by the UE 15 (not shown) at the originating side is first routed in steps 1 and 2 to the S-CSCF 90 with is located in the IMS domain and which selects a routing number from its pool of routing numbers. Then, this routing number, which actually now corresponds to a roaming number, is forwarded or routed in steps 3 and 4 via the P-CSCF 80 and a GPRS network to the addressed UE 17 at the terminating side. The addressed UE 17 initiates a CS connection setup via the VMSC 70 and the MGCF 40 in steps 5 to 10. After the pre-conditions are met, the called subscriber is alerted. Then, the UE 17 at the terminating side directly responds to the UE 15 at the originating side with a SIP 183 Session Progress message in steps 11 to 14. The UE 15 at the originating side may then send an optional UPDATE method in steps 15 to 18.

Figure 12:
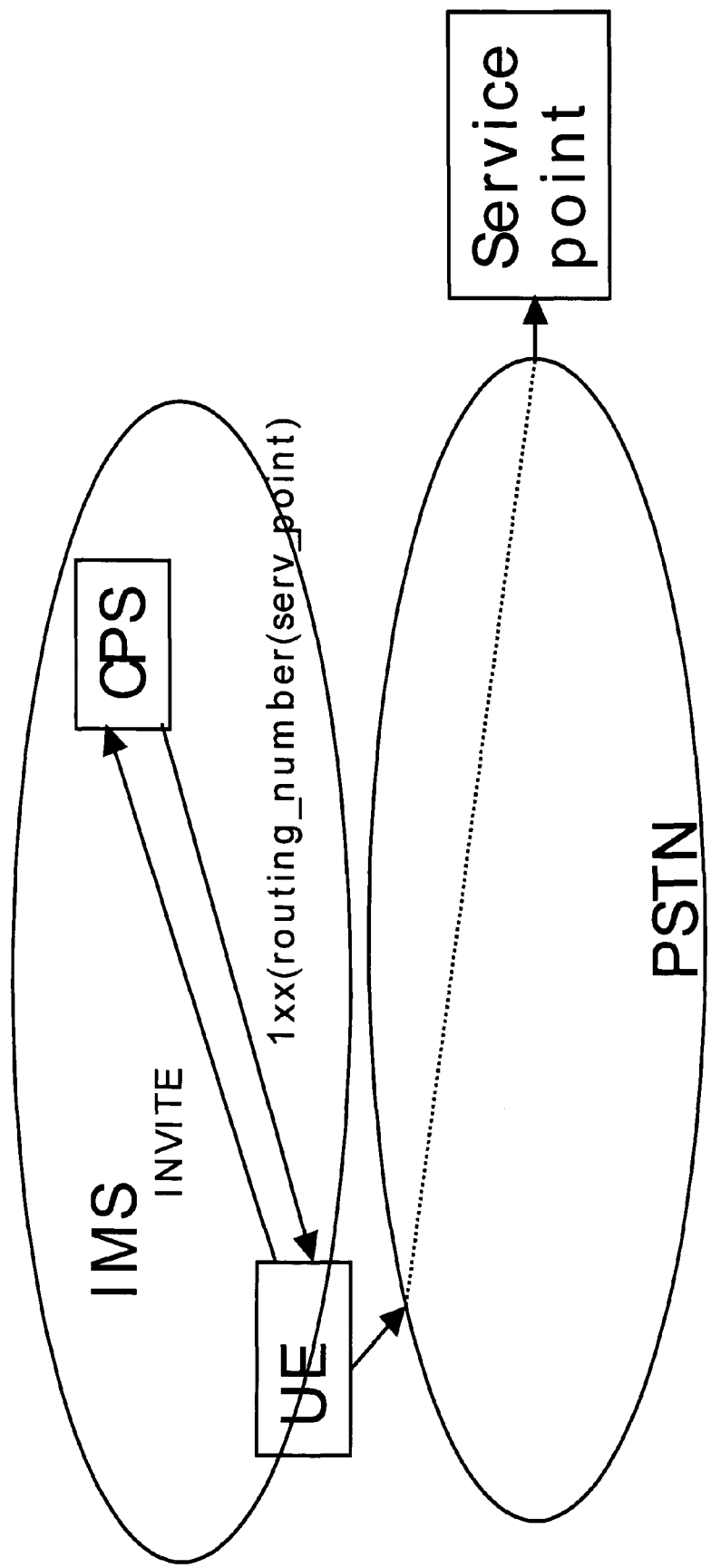
FIG. 12 shows a schematic diagram of an example of a SIP session establishment between an IMS subscriber and service node located within the CS domain, according to the third preferred embodiment.

FIG. 12 shows a schematic diagram of another example of a SIP session establishment between an IMS subscriber and service node located within the CS domain, according to the third preferred embodiment, wherein a SIP session is established to an external service node or point located in the CS domain. In this example case, the previous functionality is modified in order to enable direct optimized routing of a call to an external service node or point located somewhere in the CS domain (e.g. in a PSTN). The actual decision to route the call towards this external node is determined e.g. by the S-CSCF or Application Server 90, located in the IMS domain.

In general the functionality is as shown in this example scenario where IMS subscriber A will attempt to establish a speech session directly to the service number (e.g. number enquiry service) and SIP session attempt is still routed by using IMS domain and it's service machinery.

After successfully executed registration procedure, the IMS subscriber A dials by using a SIP URI which in this case may be expressed as:

whoswho@ims.operator.com<mailto: whoswho@ims.operator.com>

The INVITE method which establishes SIP dialog between IMS subscriber A and this service point or node is sent by the IMS subscriber A's UE. This INVITE method comprises in addition to other required headers also an additional information which purpose is to inform the IMS domain to return a specific routing number back to the IMS subscriber A's UE in order to open bearer connection through the CS domain. This information can be either embedded into SDP offer or as some completely new header (e.g. p-header).

The INVITE method is routed through the P-CSCF (not shown) to a connection processing server (CPS), e.g. S-CSCF, which is located physically in the home network of IMS subscriber A. The CPS would in this case (according previous example) try to allocate a routing number from a pool of numbers dedicated for this purposes. However, in this example, the CPS is able to determine that optimization is possible and thus session is not required to be routed through home IMS-domain as such but can be routed directly into CS domain where an actual service point or node CPS is located at. Therefore, the CPS will return a directly routable E.164 address of the service node for the CS domain call with instruction that SIP session can be otherwise ended.

In this example when the IMS subscriber A's home network is a specific network operator, the routing number of the service point is part of the numbering plan of the specific network operator in international format. The routing number is in international format in order to enable calls to be routed from other countries correctly to the home country. Example of such routing number could be +358201118, having type of number field set as "International".

The CPS of the IMS subscriber A will return the allocated number to the IMS subscriber's UE in a proper SIP 1xx method. After having received the method, the UE can analyse the number and make sanity checking to the received number in order to verify whether or not it is possible to encode that into SETUP message's called party number information element, e.g., according the 3GPP specification TS 24.008. If the routing number is not in such format, then the UE may release the session establishment attempt by issuing CANCEL towards the IMS domain.

In case the routing number seems to be valid, the UE may try to establish a normal CS voice call via the existing CS domain which in this example is GERAN for the IMS subscriber A. At this point, the SIP session establishment is on hold.

After this, as a result of this procedure, the CPS will no longer have control relationship to the UE and the call attempt is done by using the CS domain.

The CS call is routed within CS networks according the normal routing plans configured for the received routing number, e.g. E.164 number or address. In this case, it is routed all the way to the home network of the IMS subscriber A. However, in contrast to the previous example of FIG. 7 where the CS speech call was routed to the MGCF, the call would stay in this example within the CS domain and routed to the service node.

If for some reason, the CS connection cannot be established through the CS networks or the CS connection is cleared during the active voice session, the UE will receive a DISCONNECT message with appropriate cause value.

The proposed mechanism thus does not require any modifications to the mobile CS core networks nor to the fixed CS core networks.

However, the UEs that are 3GPP SIP-capable and support 3GPP IMS in overall are modified so that they are able to establish SIP voice session by using CS domain as bearer. Furthermore, the UE must be able to have simultaneously an active IP connection to the IMS home network and a voice call over the CS domain. It is clear that audio transcoding functionality would need to behave as it does today in non-IMS UEs with the difference that "call control" protocol would be 3GPP SIP instead of one specified in the 3GPP specification TS 24.008.

The proposed procedures could be also implemented with a UE not having GPRS class A or similar capability. In that case, the functionality would be that after UE has started to build a CS bearer for the speech, then the SIP control communication would be impossible. Also the release of connection would require different behaviour, i.e., the S-CSCF controlling the speech call would need to release CS bearer, and based on this event, the UE would have to re-connect towards the IMS machinery in order to re-obtain the SIP session control.

At core network side, the Connection Processing Server (CPS) node which may contain P-CSCF, I-CSCF and S-CSCF behaviours in one node may be provided with additional means or logic to determine what is the current status of subscriber's QoS, with means for handling of routing number pool(s), including configuration and use when needed in actual SIP, and capability to transport required new information in proper SIP method, e.g. within INVITE, 1xx or 3xx replies, and within a specific header or alternatively in an SDP container. The new information comprises at least one of routing number, capability information of network where the subscriber currently is present, i.e. whether or not voice over IP is possible, and the information whether or not CS domain shall be used instead of packet domain. One of the purposes of the new p-header is also to negotiate whether or not both IMS domain and UE support procedures described in this invention.

In general, only a limited set of CS (GSM/JUMTS) supplementary services may be active for subscriber who's services are mainly provided from the IMS domain. Problematical services are e.g. some Camel/IN-based services that modify the routing number or may even totally prevent call establishment at CS domain-side.

Also, the procedures described above may as well be used in order to establish other types than voice sessions. If interworking between e.g. CS multimedia/video telephony (3G-H324M) and SIP-based video telephony is provided, then other procedures can be considered.

It is thus possible for an IMS subscriber to establish voice sessions when roaming in the network not having sufficient QoS for voice over IP and still be able to use same IMS services and get his/her voice sessions through.

Specifically but not only at the terminal side, the implementation of the present invention can be based on a software routine which can be directly downloaded or in any other way loaded as a kind of feature software to a program memory of the mobile terminal. Thereby, only little modifications are required for implementation.

The present invention can be implemented in any network environment to provide an IP-based services to participants in conventional CS networks, as long as a data channel can be established between the participants and the respective enhanced IP-based conference server to signal a routing number to the participants which may then set-up a CS call towards the respective server. The preferred embodiments may thus vary within the scope of the attached claims.

The invention claimed is:

1. A method, comprising:
    transmitting via a data path a conference request directed to an application server providing a packet-switched conference call service to a circuit-switched network, the packet-switched conference call service provided using a connection between a packet-switched network and a user terminal via the circuit-switched network;
    receiving at the user terminal via the data path a temporary routing number as a conference routing number for the requested conference call service, the temporary routing number received in response to the conference request, the temporary routing number being sent to at least one other participant at one or more other user terminals connected to the application server via the circuit switched network or via one or more other circuit switched networks such that the user terminal and the at least one other participant at the one or more other user terminals receive from the application server the same temporary number to be used for the conference call service;
    establishing a circuit-switched call leg connection from the user terminal to a packet-switched network via a circuit-switched network using the temporary routing number as the conference routing number for the requested conference call service, wherein the circuit-switched call leg connection is used for providing a packet-switched conference call service to the circuit-switched network; and using the received temporary routing number to set up the circuit-switched call leg as a call leg of the conference call service.

2. A method according to claim 1, wherein said receiving comprises receiving a routing number comprising an E.164 number.

3. A method according to claim 1, wherein said receiving a temporary routing number comprises receiving a temporary routing number via at least one session initiation protocol session setup message.

4. A method according to claim 3, wherein a session initiation protocol session is kept active during a circuit-switched call.

5. A method according to claim 1, further comprising:
detecting whether said circuit-switched call leg is supported by said user terminal and said packet-switched network before said delivering.

6. A method according to claim 5, wherein said detecting comprises performing within a registration procedure.

7. A method according to claim 1, wherein said establishing comprises establishing said circuit-switched call leg comprising a call leg from an originating call.

8. A method according to claim 1, wherein said establishing comprises establishing said circuit-switched call leg comprising a call leg from a terminating call.

9. A method according to claim 1, wherein said receiving comprises receiving said routing number at said user terminal from a call control element of said packet-switched network.

10. A method according to claim 1, wherein said establishing comprises locating said user terminal outside a home network of the user terminal.

11. A method according to claim 1, further comprising:
converting said circuit-switched call leg into a voice-over internet protocol connection in a core network of said packet-switched network.

12. A method according to claim 1, wherein said establishing comprises performing using an integrated services digital network user part.

13. A method according to claim 1, further comprising:
selecting participants of said conference call; and
adding to said conference request an information specifying said selected participants.

14. A method according to claim 1, wherein said transmitting comprises performing based on a pre-configured address information.

15. A method according to claim 14, further comprising:
setting said pre-configured address information in a service subscription stage.

16. A method according to claim 1, further comprising:
adding session-related information to said conference request, said session-related information comprising at least one of a subject:
picture of the subject,
payer of the conference,
importance of the conference session,
animation,
video clip,
sound clip, and
textual description.

17. A method according to claim 1, wherein said transmitting comprises transmitting via said data path, said data path comprising a short message service channel.

18. A method according to claim 1, wherein said transmitting comprises transmitting via said data path, said data path comprising a unstructured supplementary service data, wireless application protocol, or hyper text transfer protocol channel.

19. A method according to claim 1, wherein said transmitting and receiving comprise performing using session initiation protocol.

20. A method according to claim 19, wherein said transmitting and receiving comprise performing using at least one session initiation protocol or service description protocol extension for communicating circuit-switched specific information.

21. A method according to claim 1, wherein said providing comprises setting up said circuit-switched connection to a media gateway control device which then routes the circuit-switched call to said application server.

22. A method according to claim 21, further comprising:
converting said routing number into a packet-switched conference address at said media gateway control device.

23. A method according to claim 1, further comprising:
reserving said routing number as a temporary conference routing number at said application server during establishment of said conference call; and
releasing said routing number for reuse after releasing said conference call.

24. A method according to claim 1, further comprising:
forwarding a join request to join said conference call from said application server to other participants specified in said conference request via a data path.

25. A method according to claim 24, wherein the forwarding comprises transmitting said request using a session initiation protocol invite message triggered by a received session initiation protocol refer message.

26. A method according to claim 24, wherein said forwarding comprises forwarding said join request, said join request comprising
at least one of an identification of the conference initiator,
a subject of said conference call,
a price of the conference call leg, and
an information about a moderation of said conference call, an animation, a video clip, a sound clip, and a textual description.

27. A method according to claim 1, further comprising:
forwarding, via another data path, said conference routing number from said application server to a requested participant specified in said conference request to indicate that said conference call will be established from said conference number to said requested participant,
wherein at least one circuit-switched connection is set up from said application server using said conference number as a calling party number via a media gateway control device, which then routes the conference call to said requested participant.

28. A method according to claim 1, further comprising:
forwarding a kick-out request to said application server via said data path to have a participant excluded from said conference call.

29. A method according to claim 28, wherein said forwarding comprises forwarding said kick-out request, said kick-out request comprising an identification of said conference call and an identification of at least one said participant to be excluded.

30. A method according to claim 1, wherein said receiving comprises receiving said temporary routing number for said conference call, wherein said conference call supports at least one of an audio component,
a non-real time video component,
an application component, and
a messaging component.

31. A method according to claim 1, wherein said connection set-up comprises a conference policy control protocol over an Mt interface as a data path.

32. A method according to claim 1, further comprising:
forwarding, via another data path, a join request to join said conference call from a requesting participant to at least one requested participant specified in said conference request,
wherein said join request comprises said conference routing number and a connection setup comprises setting up a circuit switched connection from the at least one requested participant to application server using said conference routing number.

33. A method according to claim 32, wherein the forwarding comprises forwarding the request using a session initiation protocol Refer message and the connection setup comprises establishing said at least one circuit switched connection using session initiation protocol invite message.

34. An apparatus, comprising:
a transmitter configured to transmit via a data path a conference request directed to an application server providing a packet-switched conference call service to a circuit-switched network, the packet-switched conference call service provided using a connection between a packet-switched network and a user terminal via the circuit-switched network;
a communicator configured to receive at the user terminal via the data path a temporary routing number as a conference routing number for the requested conference call service, the temporary routing number received in response to the conference request, the temporary routing number being sent to at least one other participant at one or more other user terminals connected to the application server via the circuit switched network or via one or more other circuit switched networks such that the user terminal and the at least one other participant at the one or more other user terminals receive from the application server the same temporary number to be used for the conference call service;
an establisher configured to establish a circuit-switched call leg connection from the user terminal to a packet-switched network via a circuit-switched network using the temporary routing number as the conference routing number for the requested conference call service, wherein the circuit-switched call leg connection is used for providing a packet-switched conference call service to the circuit-switched network; and
a processor configured to use the received temporary routing number to set up the circuit-switched call leg as a call leg of the conference call service.

35. An apparatus according to claim 34, wherein said communicator is configured to use a short message service channel for forwarding said conference request.

36. An apparatus according to claim 34, wherein said communicator is configured to use a session initiation protocol message for forwarding said conference request.

37. An apparatus according to claim 36, wherein said communicator is configured to use at least one session initiation protocol or service description protocol extension for communicating circuit-switched specific information.

38. An apparatus according to claim 34, wherein said communicator and said establisher are integrated in a telephony application of said terminal device.

39. An apparatus according to claim 34, wherein a conference call application is implemented as a native client application or as a midlet application.

40. An apparatus according to claim 34, wherein said communicator is configured to transmit said conference request in consequence of receiving a first request from another user.

41. An apparatus, comprising:
a communicator configured to receive a conference request via a data path, the conference request directed to an application server providing a packet-switched conference call service to a circuit-switched network, the packet-switched conference call service provided using a connection between a packet-switched network and a user terminal via the circuit-switched network; and
a deliverer configured to deliver, in response to the conference request, a temporary routing number to the user terminal for the circuit-switched network via the data path, wherein the connection from a packet switched network to the circuit-switched network is used to provide the packet-switched conference call service to the circuit-switched network, the temporary routing number comprising a conference routing number configured as an E.164 number, wherein the temporary routing number is also sent to at least one other participant at one or more user terminals connected to the application server via the circuit switched network or via one or more other circuit switched networks such that the user terminal and the at least one other participant at the one or more other user terminals receive from the application server the same temporary number to be used for the conference call service.

42. An apparatus according to claim 41, further comprising:
an allocator configured to allocate said conference routing number as a temporary E.164 number to said conference call.

43. An apparatus according to claim 42, wherein said allocator is configured to reserve a plurality of E.164 numbers for a plurality of conference calls.

44. An apparatus according to claim 43, wherein said reserved plurality of E.164 numbers comprises a plurality of toll-free numbers and a plurality of charged numbers.

45. An apparatus according to claim 44, wherein said allocator is configured to select said E.164 number from said plurality of charged numbers included in said conference request.

46. An apparatus according to claim 41, wherein said communicator is configured to send a conference routing number via a respective data path to other participants specified in a conference request.

47. An apparatus according to claim 46, further comprising:
a checker configured to check whether callers of received calls relating to said conference call match with said other participants specified in said conference request.

48. An apparatus according to claim 41, further comprising:
a connection controller configured to control individual call legs of participants in a media gateway device.

49. An apparatus according to claim 41, further comprising:
an interface configured to provide a direct connection to a media gateway control device to enable routing of a set-up call for a conference call from said circuit-switched network to an application server.

50. An apparatus according to claim 41, further comprising:
an implementer configured to implement media gateway controller functions.

51. A computer program embodied on a computer-readable medium, the computer program configured to control a processor to perform operations comprising:
transmitting via a data path a conference request directed to an application server providing a packet-switched conference call service to a circuit-switched network, the packet-switched conference call service provided using a connection between a packet-switched network and a user terminal via the circuit-switched network;
receiving a temporary routing number at the user terminal via the data path as a conference routing number for the requested conference call service, the temporary routing number received in response to the conference request, the temporary routing number being sent to at least one other participant at one or more other user terminals connected to the application server via the circuit switched network or via one or more other circuit switched networks such that the user terminal and the at least one other participant at the one or more other user terminals receive from the application server the same temporary number to be used for the conference call service;
establishing a circuit-switched call leg connection from the user terminal to a packet-switched network via a circuit-switched network using the temporary routing number as the conference routing number for the requested conference call service, wherein the circuit-switched call leg connection is used for providing a packet-switched conference call service to the circuit-switched network; and
using the received temporary routing number to set up the circuit-switched call leg as a call leg of the conference call service.

52. A computer program embodied on a computer-readable medium, the computer program, the computer program configured to control a processor to perform operations comprising:
receiving a conference request via a data path, the conference request directed to an application server providing a packet-switched conference call service to a circuit-switched network, the packet-switched conference call service provided using a connection between a packet-switched network and a user terminal via the circuit-switched network; and
delivering, in response to the conference request, a temporary routing number to the user terminal device for the circuit-switched network via the data path, wherein the connection from a packet switched network to the circuit-switched network is used to provide the packet-switched conference call service to the circuit-switched network, the temporary routing number comprising a conference routing number configured as an E.164 number, wherein the temporary routing number is also sent to at least one other participant at one or more other user terminals connected to the application server via the circuit switched network or via one or more other circuit switched networks such that the user terminal and the at least one other participant at the one or more other user terminals receive from the application server the same temporary number to be used for the conference call service.

53. An apparatus, comprising:
transmission means for transmitting via a data path a conference request directed to an application server providing a packet-switched conference call service to a circuit-switched network, the packet-switched conference call service provided using a connection between a packet-switched network and a user terminal via the circuit-switched network;
communication means for receiving a temporary routing number at the user terminal via the data path as a conference routing number for the requested conference call service, the temporary routing number received in response to the conference request, the temporary routing number being sent to at least one other participant at one or more other user terminals connected to the application server via the circuit switched network or via one or more other circuit switched networks such that the user terminal and the at least one other participant at the one or more other user terminals receive from the application server the same temporary number to be used for the conference call service; and
establishing means for establishing a circuit-switched call leg connection from the user terminal to a packet-switched network via a circuit-switched network using the temporary routing number as the conference routing number for the requested conference call service, wherein the connection is used for providing a packet-switched conference call service to the circuit-switched network; and
processing means for using the received temporary routing number to set up the circuit-switched call leg as a call leg of the conference call service.

54. An apparatus, comprising:
communication means for receiving a conference request via a data path, the conference request directed to an application server providing a packet-switched conference call service to a circuit-switched network, the packet-switched conference call service provided using a connection between a packet-switched network and a user terminal via the circuit-switched network; and
delivering means for delivering, in response to the conference request, a temporary routing number to the user terminal for the circuit-switched network via the data path, wherein the connection from a packet switched network to the circuit-switched network is used to provide the packet-switched conference call service to the circuit-switched network, the temporary routing number comprising a conference routing number configured as an E.164 number, wherein the temporary routing number is also sent to at least one other participant at one or more other user terminals connected to the application server via the circuit switched network or via one or more other circuit switched networks such that the user terminal and the at least one other participant at the one or more other user terminals receive from the application server the same temporary number to be used for the conference call service.

55. A method, comprising:
receiving a conference request via a data path, the conference request directed to an application server providing a packet-switched conference call service to a circuit-switched network, the packet-switched conference call service provided using a connection between a packet-switched network and a user terminal via the circuit-switched network; and
delivering, in response to the conference request, a temporary routing number to the user terminal for the circuit-switched network via the data path, wherein the connection from a packet switched network to the circuit-switched network is used to provide the packet-switched conference call service to the circuit-switched network, the temporary routing number comprising a conference routing number configured as an E.164 number, wherein the temporary routing number is also sent to at least one other participant at one or more other user terminals connected to the application server via the circuit switched network or via one or more other circuit switched networks such that the user terminal and the at least one other participant at the one or more other user terminals receive from the application server the same temporary number to be used for the conference call service.

56. A method according to claim 55, further comprising:
controlling individual call legs of participants in a media gateway device.

* * * * *